US010079655B2

(12) United States Patent
Blankenship et al.

(10) Patent No.: US 10,079,655 B2
(45) Date of Patent: Sep. 18, 2018

(54) RADIO NODE, WIRELESS DEVICE AND METHODS THEREIN, FOR CONFIGURING A PLURALITY OF CHANNEL QUALITY INFORMATION VALUES

(71) Applicant: Telefonaktiebolaget LM Ericsson (publ), Stockholm (SE)

(72) Inventors: Yufei Blankenship, Kildeer, IL (US); Johan Bergman, Stockholm (SE)

(73) Assignee: Telefonaktiebolaget LM Ericsson (publ) (SE)

( * ) Notice: Subject to any disclaimer, the term of this patent is extended or adjusted under 35 U.S.C. 154(b) by 239 days.

(21) Appl. No.: 14/916,944

(22) PCT Filed: Jan. 26, 2016

(86) PCT No.: PCT/SE2016/050047
§ 371 (c)(1),
(2) Date: Mar. 4, 2016

(87) PCT Pub. No.: WO2016/122380
PCT Pub. Date: Aug. 4, 2016

(65) Prior Publication Data
US 2016/0365944 A1    Dec. 15, 2016

Related U.S. Application Data

(60) Provisional application No. 62/109,641, filed on Jan. 30, 2015.

(51) Int. Cl.
| | |
|---|---|
| *H04L 1/00* | (2006.01) |
| *H04L 1/08* | (2006.01) |
| *H04W 72/12* | (2009.01) |
| *H04W 4/70* | (2018.01) |
| *H04W 88/02* | (2009.01) |
| *H04W 88/08* | (2009.01) |

(52) U.S. Cl.
CPC ............. *H04L 1/0026* (2013.01); *H04L 1/08* (2013.01); *H04W 4/70* (2018.02); *H04W 72/1289* (2013.01); *H04W 88/02* (2013.01); *H04W 88/08* (2013.01)

(58) Field of Classification Search
CPC ........... H04L 29/06197; H04L 65/1006; H04L 65/1016; H04L 65/1073; H04L 69/22; H04W 8/02; H04W 60/04
See application file for complete search history.

(56) References Cited

U.S. PATENT DOCUMENTS

| | | | |
|---|---|---|---|
| 2009/0274204 A1 | 11/2009 | Chen et al. | |
| 2009/0316815 A1 | 12/2009 | Glazko et al. | |
| 2014/0036799 A1* | 2/2014 | Bharadwaj | H04W 72/085 370/329 |
| 2016/0182208 A1* | 6/2016 | Yi | H04L 1/0026 370/329 |
| 2016/0285535 A1* | 9/2016 | Kim | H04L 5/0016 |

FOREIGN PATENT DOCUMENTS

WO    2015012653 A1    1/2015

OTHER PUBLICATIONS

3GPP, "3rd Generation Partnership Project; Technical Specification Group Radio Access Network; Evolved Universal Terrestrial Radio Access (E-UTRA); Physical channels and modulation (Release 12)", 3GPP TS 36.211 V12.0.0, Dec. 2013, 1-120.
3GPP, "3rd Generation Partnership Project; Technical Specification Group Radio Access Network; Evolved Universal Terrestrial Radio Access (E-UTRA); Physical layer procedures (Release 12)", 3GPP TS 36.213 V12.4.0, Dec. 2014.
3GPP, "3rd Generation Partnership Project; Technical Specification Group Radio Access Network; Evolved Universal Terrestrial Radio Access (E-UTRA); Physical layer procedures (Release 12)", 3GPP TS 36.213 V12.0.0, Dec. 2013, 1-186.
3GPP, "3rd Generation Partnership Project; Technical Specification Group Radio Access Network; Study on provision of low-cost Machine-Type Communications (MTC) User Equipments (UEs) based on LTE (Release 12)", 3GPP TR 36.888 V12.0.0, Jun. 2013, 1-55.

* cited by examiner

*Primary Examiner* — Chi H Pham
*Assistant Examiner* — Weibin Huang
(74) *Attorney, Agent, or Firm* — Murphy, Bilak & Homiller, PLLC

(57) ABSTRACT

A method performed by a radio node (101) for configuring a plurality of Channel Quality Information (CQI) values. The radio node (101) operates in a wireless communication network (100). The radio node (101) configures (301) the plurality of CQI values. Each of the plurality of CQI values are configured in association with a first indication for a number of repetitions of data transmission. Also described is a method performed by a wireless device (120) for receiving configuration data from the radio node (101). The wireless device (120) operates in the wireless communication network (100). The wireless device (120) receives (401) the configuration data from the radio node (101). The configuration data indicates configuration for the plurality of CQI values.

26 Claims, 10 Drawing Sheets

RADIO NODE, WIRELESS DEVICE AND METHODS THEREIN, FOR CONFIGURING A PLURALITY OF CHANNEL QUALITY INFORMATION VALUES

TECHNICAL FIELD

The present disclosure relates generally to a radio node, and methods therein for configuring a plurality of Channel Quality Information (CQI) values. The configuring may be, e.g., of a wireless device. The present disclosure also relates to the wireless device, and methods therein for receiving configuration data from the radio node. The present disclosure relates as well to computer programs and computer-readable storage mediums, having stored thereon the computer programs to carry out the aforementioned methods.

BACKGROUND

Communication devices such as wireless devices are also known as e.g. User Equipments (UE), mobile terminals, terminals, wireless terminals and/or mobile stations. Terminals may be enabled to communicate wirelessly in a cellular communications network or wireless communication system, sometimes also referred to as a cellular radio system or cellular networks. The communication may be performed e.g. between two terminals, between a terminal and a regular telephone and/or between a terminal and a server via a Radio Access Network (RAN) and possibly one or more core networks, comprised within the cellular communications network.

Wireless devices may further be referred to as mobile telephones, cellular telephones, laptops, or tablets with wireless capability, just to mention some further examples. The terminals in the present context may be, for example, portable, pocket-storable, hand-held, computer-comprised, or vehicle-mounted mobile devices, enabled to communicate voice and/or data, via the RAN, with another entity, such as another terminal or a server.

The cellular communications network covers a geographical area which may be divided into cell areas, wherein each cell area may be served by an access node such as a base station, e.g. a Radio Base Station (RBS), which sometimes may be referred to as e.g. "Enhanced Node-B (eNodeB or eNB), "NodeB", "B node", or BTS (Base Transceiver Station), depending on the technology and terminology used. The base stations may be of different classes such as e.g. macro eNodeB, home eNodeB or pico base station, based on transmission power and thereby also cell size. A cell is the geographical area where radio coverage is provided by the base station at a base station site. One base station, situated on the base station site, may serve one or several cells. Further, each base station may support one or several communication technologies. The base stations communicate over the air interface operating on radio frequencies with the terminals within range of the base stations. In the context of this disclosure, the expression Downlink (DL) is used for the transmission path from the base station to the mobile station. The expression Uplink (UL) is used for the transmission path in the opposite direction i.e. from the mobile station to the base station.

In 3rd Generation Partnership Project (3GPP) Long Term Evolution (LTE), base stations, which may be referred to as eNodeBs or even eNBs, may be directly connected to one or more core networks.

LTE uses Orthogonal Frequency Division Multiplexing (OFDM) in the DL and Discrete Fourier Transform (DFT)-spread OFDM in the UL. The basic LTE DL physical resource may thus be seen as a time-frequency grid as illustrated in FIG. 1, where each resource element corresponds to one OFDM subcarrier during one OFDM symbol interval. One resource element comprises one OFDM symbol including a cyclic prefix.

Machine-Type Communication (MTC)

Machine Type Communication (MTC) is a form of data communication which involves one or more entities that do not necessarily need human interaction. MTC devices are devices which communicate through MTC. In some particular instances, MTC devices may be wireless devices equipped for MTC, as just described, which wireless devices may communicate through a Public Land Mobile Network (PLMN) with MTC Server(s) and/or other MTC Device(s). An MTC Server is a server which may communicate to the PLMN itself, and to MTC Devices through the PLMN. The MTC Server may also have an interface which may be accessed by the MTC User. The MTC Server may perform services for the MTC User. An MTC User may use the service provided by the MTC Server. MTC devices may be, for example, home and/or building automation devices, alarms, emission control, toll payment devices, people tracking devices, parcel tracking devices, sensor networks, industrial automation devices, personal network devices etc. . . .

It is efficient for MTC operators to be able to serve MTC UEs using already deployed radio access technology. Therefore, 3GPP LTE has been investigated as a competitive radio access technology for efficient support of MTC. Lowering the cost of MTC UEs is an important enabler for implementation of the concept of the "internet of things". MTC UEs used for many applications may require low operational power consumption and are expected to communicate with infrequent small burst transmissions. In addition, there is a substantial market for the M2M use cases of devices deployed deep inside buildings which may require coverage enhancement, in comparison to the defined LTE cell coverage footprint.

Enhanced coverage may be understood as coverage improvement in comparison to defined LTE cell coverage footprint as engineered for "normal" LTE UEs. A "normal" LTE UE may be understood as an LTE UE which has at least the default implementation, including: (a) being able to transmit and receive over the full system bandwidth; (b) having at least two receiver antennas and one transmit antenna; (c) having a maximum transmit power of 23 dBm.

3GPP LTE Rel-12 has defined a UE power saving mode allowing long battery lifetime, and a new UE category allowing reduced modem complexity. In Rel-13, further MTC work is expected to further reduce UE cost and provide coverage enhancement. The key element to enable cost reduction is to introduce reduced UE Radio Frequency (RF) bandwidth of 1.4 Mega Hertz (MHz) in the DL and the UL within any system bandwidth.

Channel Quality Indicator (CQI)

CQI may be understood as information signalled by a UE to the base station to indicate a suitable data rate, typically, a Modulation and Coding Scheme (MCS) value, for DL transmissions, usually based on a measurement of the received DL Signal to Interference plus Noise Ratio (SINR) and knowledge of the UE's receiver characteristics. The CQI indices and their interpretations are given in Table 7.2.3-1 of 3GPP TS 36.213 V12.4.0 for reporting CQI based on Quadrature Phase Shift Keying (QPSK), 16 Quadrature Amplitude Modulation (QAM) and 64QAM.

Table 1 depicts an example of an existing 4-bit CQI Table, as described in 3GPP TS36.213 V12.4.0, Table 7.2.3-1.

Table 1 comprises a number of entries or rows. Each entry has assigned an identifier, the CQI index, which is a number from 0-15 in this case. Each entry is associated with a respective value of modulation, e.g., QPSK, 16QAM or 64 QAM. Each entry is also associated with a respective value of code rate and efficiency. In Table 1, the code rate x1024 indicates a quantized version of the code rate. Also in the table, the efficiency indicates the number of information bits that may be sent per modulation symbol. Out of range, in Table 1, indicates that the radio node, e.g., the eNodeB, may not reliably transmit a transport block to the UE, even with the lowest modulation and coding rate scheme, i.e., the CQI index 1 does not satisfy the condition of transport block error probability not exceeding 0.1 when the PDSCH uses the corresponding combination of modulation scheme and transport block size.

Based on an unrestricted observation interval in time and frequency, the UE may derive, for each CQI value reported in UL subframe n, the highest CQI index between 1 and 15 in Table 7.2.3-1, or Table 7.2.3-2, which satisfies the following condition, or CQI index 0 if CQI index 1 does not satisfy the condition:

A single Physical Downlink Share Channel (PDSCH) transport block with a combination of modulation scheme and transport block size corresponding to the CQI index, and occupying a group of DL physical resource blocks termed the Channel State Information (CSI) reference resource, could be received with a transport block error probability not exceeding 0.1.

TABLE 1

| CQI index | modulation | code rate × 1024 | efficiency |
|---|---|---|---|
| 0 | | out of range | |
| 1 | QPSK | 78 | 0.1523 |
| 2 | QPSK | 120 | 0.2344 |
| 3 | QPSK | 193 | 0.377 |
| 4 | QPSK | 308 | 0.6016 |
| 5 | QPSK | 449 | 0.877 |
| 6 | QPSK | 602 | 1.1758 |
| 7 | 16QAM | 378 | 1.4766 |
| 8 | 16QAM | 490 | 1.9141 |
| 9 | 16QAM | 616 | 2.4063 |
| 10 | 64QAM | 466 | 2.7305 |
| 11 | 64QAM | 567 | 3.3223 |
| 12 | 64QAM | 666 | 3.9023 |
| 13 | 64QAM | 772 | 4.5234 |
| 14 | 64QAM | 873 | 5.1152 |
| 15 | 64QAM | 948 | 5.5547 |

The existing CQI table may not be applied to MTC, since the existing CQI table assumes that a PDSCH transmission is contained within a single subframe. This does not work for low-complexity and/or enhanced coverage MTC UEs, because they may rely on repetitions of data transmission, which may extend beyond a single subframe. The existing CQI table assumes that one PDSCH transmission carries one transport block. In MTC, the numerous repetitions of a single PDSCH, together may carry a single TB. The number of repetitions of the PDSCH may be tens of repetitions or hundreds of repetitions, depending on the level of degraded channel quality the UE experiences. Ignoring the availability of the PDSCH repetitions may lead to the UE indicating lower CQI index than necessary. For example, down to a certain degraded chancel quality, using the existing CQI table may lead to the UE indicating "out of range" to eNodeB, causing the eNodeB to not scheduling any PDSCH transport block to the UE. Therefore, applying the existing CQI table to MTC may severely bias the PDSCH transport block transmission to a low modulation and coding scheme corresponding to a low CQI, including no scheduled transmission opportunity, leading to a reduced performance of the wireless communication network.

Further detailed information on the subjects just exposed may be found for example, in 3GPP TS 36.211 V12.0.0, 3rd Generation Partnership Project; Technical Specification Group Radio Access Network; Evolved Universal Terrestrial Radio Access (E-UTRA); Physical channels and modulation (Release 12), 3GPP TS 36.213 V12.4.0, 3rd Generation Partnership Project; Technical Specification Group Radio Access Network; Evolved Universal Terrestrial Radio Access (E-UTRA); Physical layer procedures (Release 12), and 3GPP TR 36.888 v12.0.0, Study on provision of low-cost Machine-Type Communications (MTC) User Equipments (UEs) based on LTE (Release 12).

SUMMARY

It is therefore an object of embodiments herein to improve the performance of a wireless communication network by providing methods for configuring Channel Quality Information. In some embodiments, the configuring may be of wireless devices.

Several embodiments are comprised herein. More specifically the following are radio node and wireless device related embodiments.

According to a first aspect of embodiments herein, the object is achieved by a method performed by a radio node. The method is for configuring a plurality of CQI values. The radio node 101 operates in a wireless communication network. The radio node configures the plurality of CQI values. Each of the plurality of CQI values is configured in association with a first indication for a number of repetitions of data transmission.

According to a second aspect of embodiments herein, the object is achieved by a method performed by a wireless device. The method is for receiving configuration data from the radio node. The radio node and the wireless device operate in the wireless communication network. The wireless device receives the configuration data from the radio node. The configuration data indicates configuration for the plurality of CQI values. Each CQI value of the plurality of CQI values is associated with the first indication for the number of repetitions of data transmission.

According to a third aspect of embodiments herein, the object is achieved by a radio node configured to configure the plurality of CQI values. The radio node is configured to operate in the wireless communication network. The radio node is further configured to configure the plurality of CQI values. Each of the plurality of CQI values is configured in association with the first indication for the number of repetitions of data transmission.

According to a fourth aspect of embodiments herein, the object is achieved by a wireless device configured to receive configuration data from the radio node. The radio node and the wireless device are configured to operate in the wireless communication network. The wireless device is further configured to receive the configuration data from the radio node. The configuration data is configured to indicate the configuration for the plurality of CQI values. Each CQI value of the plurality of CQI values is associated with the first indication for the number of repetitions of data transmission.

According to a fifth aspect of embodiments herein, the object is achieved by a computer program, comprising instructions which, when executed on at least one processor, cause the at least one processor to carry out the method performed by the radio node.

According to a sixth aspect of embodiments herein, the object is achieved by a computer-readable storage medium, having stored thereon the computer program, comprising instructions which, when executed on at least one processor, cause the at least one processor to carry out the method performed by the radio node.

According to a seventh aspect of embodiments herein, the object is achieved by a computer program, comprising instructions which, when executed on at least one processor, cause the at least one processor to carry out the method performed by the wireless device.

According to an eighth aspect of embodiments herein, the object is achieved by a computer-readable storage medium, having stored thereon the computer program, comprising instructions which, when executed on at least one processor, cause the at least one processor to carry out the method performed by the wireless device.

By the radio node configuring the plurality of CQI values, each of the plurality of CQI values being configured in association with the first indication for the number of repetitions of data transmission, the radio node is able to configure itself with CQI values that are well suited to for processing channel quality in a context of repetitions of data transmission, such as in MTC.

According to embodiments herein, CQI values may also be configured at the wireless device relating to data transmissions that are repeatedly performed. This may enable wireless devices with certain characteristics, such as MTC devices, to feedback a channel condition in a proper manner, leading to an improved performance of the wireless communication network. Embodiments herein provide the advantage that they allow a e.g. a narrow-band MTC UE to operate in a legacy LTE system with wider system bandwidth, and to be able to report CQI with a range that matches the level of repetitions the PDSCH may experience.

BRIEF DESCRIPTION OF THE DRAWINGS

Examples of embodiments herein are described in more detail with reference to the accompanying drawings, in which.

DETAILED DESCRIPTION

As part of the development of embodiments herein, a problem will first be identified and discussed.

In existing systems, the CQI definition does not have to support a Rel-13 type of MTC UE, which may have low complexity and/or enhanced coverage. The existing CQI design does not account for reduced DL and UL bandwidth, or the need to repeat DL transmission, including the PDSCH, multiple times, e.g., 10 seconds (s)-100 s in time, for such MTC UEs.

Due to the above constraints of a Rel-13 MTC UE, the existing CQI design may not be applied directly, as this may lead to a lost communication.

Embodiments herein may be understood to provide a CQI Definition for Rel-13 MTC UE.

Embodiments will now be described more fully hereinafter with reference to the accompanying drawings, in which examples of the claimed subject matter are shown. The claimed subject matter may, however, be embodied in many different forms and should not be construed as limited to the embodiments set forth herein. Rather, these embodiments are provided so that this disclosure will be thorough and complete, and will fully convey the scope of the claimed subject matter to those skilled in the art.

Figure 1:
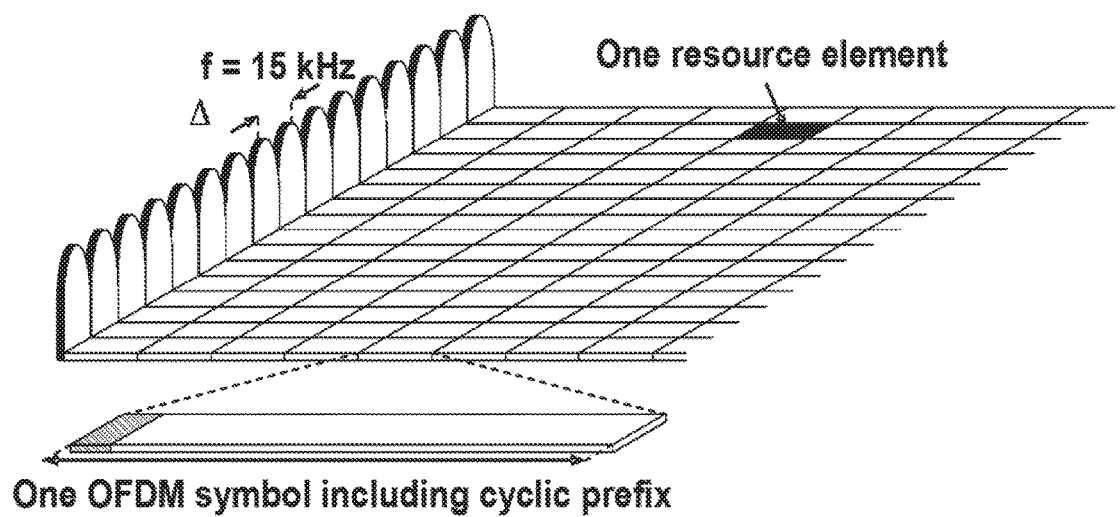
FIG. 1 is a schematic illustration of the LTE downlink physical resource.
Figure 2:
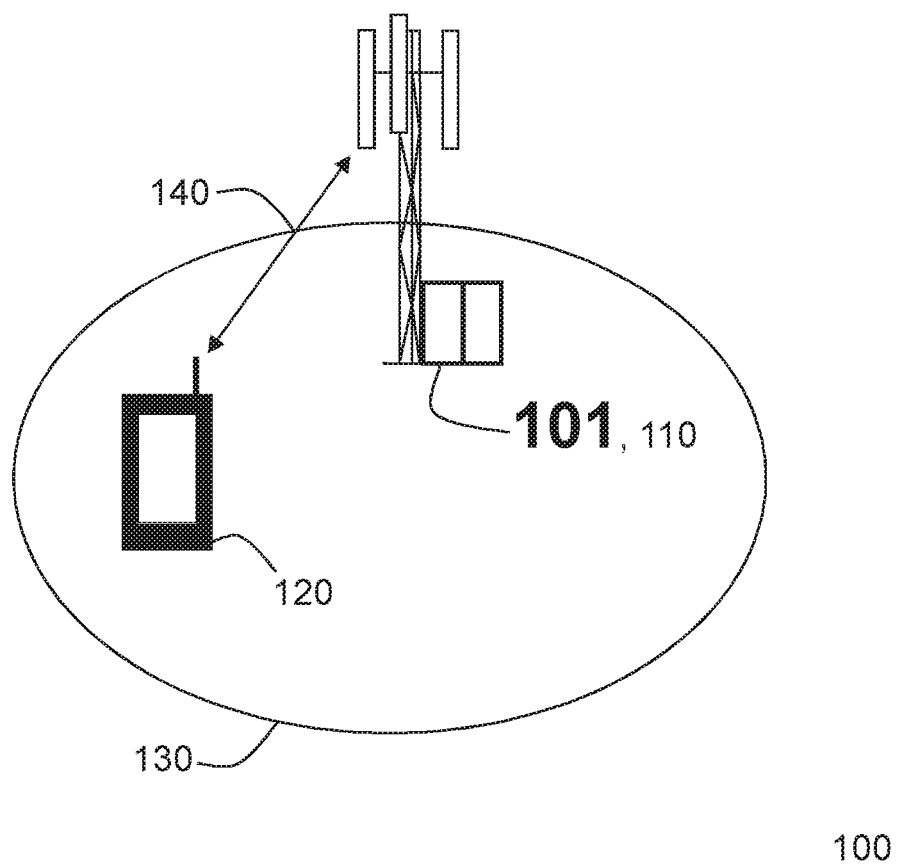
FIG. 2 is a schematic diagram depicting a wireless communication network, according to embodiments herein.

FIG. 2 depicts an example of a wireless communication network 100, sometimes also referred to as a cellular radio system, cellular network or wireless communications system, in which embodiments herein may be implemented. The wireless communication network 100 may for example be a network such as a Long-Term Evolution (LTE), e.g. LTE Frequency Division Duplex (FDD), LTE Time Division Duplex (TDD), LTE Half-Duplex Frequency Division Duplex (HD-FDD), LTE operating in an unlicensed band, Wideband Code Division Multiple Access (WCDMA), Universal Terrestrial Radio Access (UTRA) TDD, Global System for Mobile communications (GSM) network, GSM/Enhanced Data Rate for GSM Evolution (EDGE) Radio Access Network (GERAN) network, Ultra-Mobile Broadband (UMB), EDGE network, network comprising of any combination of Radio Access Technologies (RATs) such as e.g. Multi-Standard Radio (MSR) base stations, multi-RAT base stations etc., any 3rd Generation Partnership Project (3GPP) cellular network, WiFi network, Worldwide Interoperability for Microwave Access (WiMax), 5G system or any cellular network or system. Thus, although terminology from 3GPP LTE may be used in this disclosure to exemplify embodiments herein, this should not be seen as limiting the scope of the embodiments herein to only the aforementioned system.

The wireless communication network 100 comprises a radio node 101. The radio node 101 may be a radio network node, such as a network node 110 described below, or a wireless device such as a wireless device 120 described below. In the non-limiting particular example illustrated in FIG. 2, the radio node 101 is the network node 110.

The wireless communication network 100 comprises a plurality of network nodes whereof the network node 110 is depicted in FIG. 2. The network node 110 may be a transmission point such as a radio base station, for example an eNB, an Home Node B, an Home eNode B or any other network node capable to serve a wireless device, such as a user equipment or a machine type communication device in a wireless communication network.

The wireless communication network 100 covers a geographical area which is divided into cell areas, wherein each cell area may be served by a network node, although, one network node may serve one or several cells. In the non-limiting example depicted in FIG. 2, the network node 110 serves a cell 130. The cell 130 may be used for communication between the network node 110 and the wireless device 120. The network node 100 may be of different classes, such as, e.g., a macro eNodeB, a home eNodeB or a pico base station, based on transmission power and thereby also cell size. Typically, the wireless communication network 100 may comprise more cells similar to the cell 130, served by their respective network node. This is not depicted in FIG. 2 for the sake of simplicity. The network node 110 may support one or several communication technologies, and its name may depend on the technology and terminology used. In 3GPP LTE, the network node 110, which may be referred to as eNodeBs or even eNBs, may be directly connected to one or more core networks, which are not represented in FIG. 2.

A wireless device 120 also referred to herein as a user equipment (UE) is located in the wireless communication network 100. The wireless device 120 is a wireless communication device such as a UE, which is also known as e.g. mobile terminal, wireless terminal and/or mobile station. The device is wireless, i.e., it is enabled to communicate wirelessly in the wireless communication network 100. The communication may be performed e.g., between two devices, between a device and a regular telephone and/or between a device and a server. The communication may be performed e.g., via a RAN and possibly one or more core networks, comprised within the wireless communication network 100.

The wireless device 120 may further be referred to as a mobile telephone, cellular telephone, or laptop with wireless capability, just to mention some further examples. The wireless device 120 in the present context may be, for example, a portable, pocket-storable, hand-held, computer-comprised, or vehicle-mounted mobile device, enabled to communicate voice and/or data, via the RAN, with another entity, such as a server, a laptop, a Personal Digital Assistant (PDA), or a tablet computer, sometimes referred to as a surf plate with wireless capability, a Machine-to-Machine (M2M) device, a device equipped with a wireless interface, such as a printer or a file storage device or any other radio network unit capable of communicating over a radio link in a cellular communications system.

The wireless device 120 is configured to communicate within the wireless communication network 100 with the network node 110 over a radio link 140 in the cell 130.

Note that although terminology from 3GPP LTE has been used in this disclosure to exemplify the embodiments herein, this should not be seen as limiting the scope of the embodiments herein to only the aforementioned system. Other wireless systems, including WCDMA, WiMax, UMB and GSM, may also benefit from exploiting the ideas covered within this disclosure. Thus, any reference herein to a UE is understood to apply to a wireless device, such as the wireless device 120. Any reference herein to an eNB is understood to apply to a radio node such as the radio node 101, e.g., the network node 110.

Also note that terminology such as eNodeB and UE should be considering non-limiting and does in particular not imply a certain hierarchical relation between the two; in general "eNodeB" could be considered as device 1 and "UE" as device 2, and these two devices communicate with each other over some radio channel.

In this section, the embodiments herein will be illustrated in more detail by a number of exemplary embodiments. It should be noted that these embodiments are not mutually exclusive. Components from one embodiment may be tacitly assumed to be present in another embodiment and it will be obvious to a person skilled in the art how those components may be used in the other exemplary embodiments.

In particular, embodiments herein may be understood as providing approaches to support DL channel quality measurement and reporting for e.g. narrow band MTC in LTE.

Embodiments herein may provide several methods for defining a CQI table for an enhanced-coverage UE, such as the wireless device 120. The existing CQI table may be modified according to embodiments herein, to provide indication for cases where repetitions may be necessary for DL data transmission, with the number of repetitions varying from a few to hundreds.

Embodiments herein may also provide several methods to adapt the CQI definition according to an operating condition of the MTC UE, including, for example, the channel condition of the radio link 140 between the radio node 101, such as an eNodeB and the wireless device 120, such as a UE, which may be related to the location where the MTC UE may be deployed, the average data rate of the type of service the MTC UE may be expected to perform, or the number of receiving antennas the UE may be equipped with. This is different from the existing CQI definition, where a single CQI definition is intended to cover the whole range of operating conditions a UE may encounter.

Embodiments herein may also provide several methods relating to the associated signalling to enable the new CQI definition provided herein.

Figure 3:
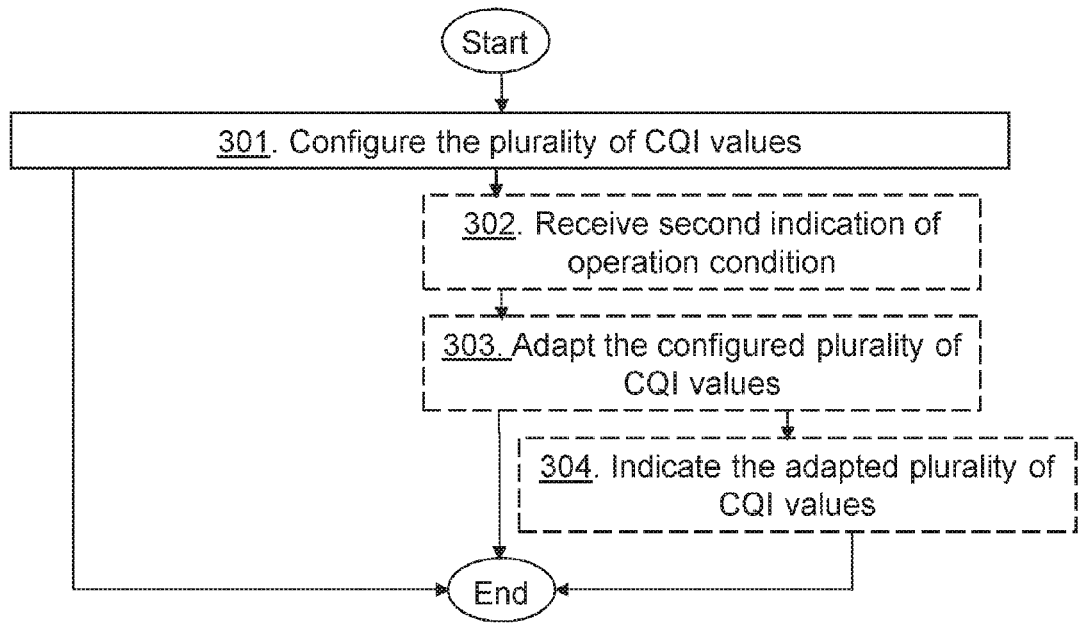
FIG. 3 is a flowchart depicting embodiments of a method in a radio node, according to embodiments herein.

Embodiments of a method performed by the radio node 101 for configuring a plurality of CQI values, will now be described with reference to the flowchart depicted depicted in FIG. 3. The radio node 101 operates in the wireless communication network 100.

The method may comprise the following actions, which actions may as well be carried out in another suitable order than that described below. Not all actions need be performed. In FIG. 3, optional actions are represented as dashed blocks.

Action 301

In some examples below, the wireless device 120 may be an MTC UE with the characteristics thereof. Since the wireless device 120 may be a Rel-13 MTC UE, and it may operate in normal coverage and enhanced coverage, the proper modulation and coding rate range may vary dramatically depending on the amount of coverage enhancement.

For a normal coverage UE, the existing CQI table, without the entries corresponding to 256QAM modulation introduced in Rel-12, may be used, as shown in Table 1.

For the wireless device 120, operating with enhanced coverage, the higher-order modulation, e.g. 16QAM and 64QAM, entries in the CQI Table 1 may no longer be useful, as discussed earlier. For enhanced coverage, a new CQI definition, as provided herein, may be necessary, so that there may be a CQI range in normal coverage, and one in enhanced coverage. This new definition may be accomplished by the performing Action 301, as described below.

In order to obtain CQI which takes into account the repeated DL transmissions by the radio node 101, which may be necessary e.g., in coverage enhancement, in this Action, the radio node 101 configures the plurality of CQI values. Each of the plurality of CQI values is configured in association with a first indication for a number of repetitions of data transmission, e.g., DL data transmission by the radio node 101. The DL data transmission may be e.g., of PDSCH. The first indication may indicate the number of repetitions of data transmission. An indication, as understood herein may be a number, or another code or instruction. The nomenclature first indication and second indication is used herein. First and second, in this context, should not be interpreted as a first of a repeated series of the same indication, but as a way to distinguish between different indications.

That each of the plurality of CQI values is configured in association with the first indication may be understood as that the whole plurality may be associated with the indication.

The plurality of CQI values may be, for example, a table of CQI values. It may also be a group of CQI values that may be added to an existing table of CQI values, such as Table 1. That is, the plurality of CQI values may be a new set of entries that may be appended to, or replacing existing entries in e.g., Table 1.

In some embodiments, the radio node 101 may configure the wireless device 120 operating in the wireless communication network 100 with the plurality of CQI values. In such embodiments, each CQI value of the plurality of CQI values may be associated with the first indication, wherein the first indication may be that the data transmission is repeatedly transmitted towards the wireless device 120. Repeatedly transmitted may mean e.g., repeated across a plurality of subframes in time.

The radio node 101 may configure the wireless device 120 by sending configuration data to the wireless device 120. The configuration data may indicate configuration for the plurality of CQI values at the wireless device 120. The configuration may be performed according to a signal sent from the radio node 101. The signal sent from the radio node 101 may be, for example, a broadcasted signal, or it may be comprised in a wireless device-specific RRC message sent through the radio link 140. In some embodiments, the radio node 101 may perform the configuration by for example, sending the first indication for the number of repetitions of data transmission to the wireless device 120, such that the plurality of CQI values may be implicitly derived from the received first indication.

In some embodiments, the first indication for the number of repetitions of data transmission may provide, or comprise, a set of numbers of repetitions of data transmission.

The configured plurality of CQI values may, for example, comprise 16 values, all of which may be configured in association with a QPSK modulation. In other examples, the configured plurality of CQI values may comprise 32 values, all of which may be configured in association with the QPSK modulation.

The CQI values may be configured in association with, as an example of the first indication, an indication of spectral efficiency. The indication of spectral efficiency may be calculated based on a repetition of information across a plurality of radio resources in time, e.g., repetition across a plurality of subframes in time.

The CQI values may be known to the radio node 101 as well, so that the radio node 101 may know how to interpret a reported CQI value. That is, in some embodiments, the radio node 101 may, in this Action, configure itself with the plurality of CQI values.

Different methods may be used to provide a new CQI definition for enhanced coverage. These methods are described below as Example Method 1, Example Method 2, and Example Hybrid methods.

Action 302

In this Action, the radio node 101 may receive a second indication from the wireless device 120 for an operation condition of the wireless device 120 relating to coverage. The radio node 101 may receive the second indication by receiving a message from the wireless device 120, e.g. via the radio link 140. That is, a signal sent from the wireless device 120. In one example, the message may be embedded, for example, in code, time, or frequency resource the wireless device 120 may have selected to transmit PRACH. The operation condition may be understood as a manner or mode in which the wireless device 120 may operate, or as one or more circumstances under which the wireless device 120 may operate, such as the coverage level. The coverage level may be based e.g., on a Reference Signal Received Power (RSRP) measurement. In some embodiments, the operation condition may relate to one of: channel quality under a threshold, to define what may be considered as bad channel quality, and channel quality over a threshold, to define what may be considered as good channel quality. The channel may be for example the radio link 140. The channel quality may be one value out of a set of values. The value may then be over or under the threshold, which may be a preconfigured threshold.

In some embodiments, the operation condition may relate to one of: normal coverage and enhanced coverage, as described above. Normal coverage, in the context herein, may be understood as a condition not being that of enhanced coverage.

Action 303

In this Action, the radio node 101 may then adapt the configured plurality of CQI values or select a part of the plurality of CQI values according to the received second indication from the wireless device 120. That is, the radio node 101 may have, in Action 301, configured a second table of CQI values, in addition to the pre-existing CQI table of e.g. Table 1. After receiving the second indication form the wireless device 120, if, for example, it indicates that the wireless device 120 operates in coverage enhancement, in this Action 303, the radio node 101 may determine to use the second table of CQI values. That is, the table that takes into account that the DL data transmissions may be repeated. Alternatively, it may select the part of the plurality of CQI values, which may be better suited for coverage enhancement.

In some embodiments, the operation condition may relate to the channel quality value. The plurality of CQI values may comprise multiple sets of CQI values. The multiple sets of CQI values may overlap. The radio node 101 may then select one set of the multiple sets of CQI values, wherein the one set of the multiple sets of CQI values may have been selected based on the channel quality value. That is, the radio node 101 may then adapt the configured plurality of CQI values by selecting a first set of the plurality of CQI values when the operation condition is of channel quality under the threshold, and a second set of the plurality of CQI values when the operation condition is of channel quality over the threshold. This is because if the channel quality is poor, i.e., under the threshold, there may be some modulation schemes that may not be used, in which case a range of values of the CQI may not need to be used by the wireless device 120.

By performing this Action 303, the radio node 101 may make use of the CQI values that may be better suited in the context of e.g., coverage enhancement, the quality of the channel between the radio node 101 and the wireless device 120, and/or the capability of the wireless device.

Action 304

In this Action, the radio node 101 may indicate the adapted plurality of CQI values to the wireless device 120, as adapted in Action 303. This may be performed by sending a third indication to the wireless device 120, e.g., via the radio link 140. The third indication may be a message comprising an explicit indication of the adapted plurality of CQI values, or by sending a different indication for it, that may have been preconfigured. For example, by sending an indication to use the plurality of CQI values configured in Action 301, such as an indication to use the CQI table for a coverage enhancement mode.

In other words, in this Action, the radio node 101 may then configure the wireless device 120 to use the adapted plurality of CQI values. In some embodiments, wherein the operation condition may be related to a channel quality value, and the plurality of CQI values may comprise multiple sets of CQI values, the indicating in this Action 304 may comprises configuring the wireless device 120 to use the one set of the multiple sets of CQI values, wherein the one set of the multiple sets of CQI values may have been selected based on the channel quality value. In other words, the third indication from the radio node 101 may indicate to use one set of the multiple sets of CQI values to the wireless device 120. For example, the radio node 101 may then configure the wireless device 120 to use the first set of the plurality of CQI values when the operation condition is of channel quality under the threshold, and to use the second set of the plurality of CQI values when the operation condition is of channel quality over the threshold.

In some embodiments, the operation condition may relate to a capability of the wireless device 120, which capability may be, e.g., a number of antennas of the wireless device 120. For example, UEs with two receive antennas may be matched with a CQI definition table with higher spectral efficiency, while UEs with a single receive antenna may be matched with a CQI definition table with higher spectral efficiency.

The radio node 101 may additionally receive a CQI value from the wireless device 120, which may be a value of the configured plurality of CQI values.

In some embodiments, a CQI value that may be received from the wireless device 120 according to the value of the configured plurality of CQI values, may be based on a CSI reference resource in time domain which may be defined by one or more DL or special subframes. The CSI may be understood as a type of CQI. The CSI reference resource for a serving cell, such as the cell 130 may be defined as follows:

In the frequency domain, the CSI reference resource may be defined by the group of DL physical resource blocks to which the derived CQI value relates.

In the time domain, for a wireless device configured in transmission mode 1-9 or transmission mode 10, as defined in 3GPP TS 36.213 v12.0.0, with a single configured CSI process for the serving cell, the CSI reference resource may be defined by a one or more DL or special subframes ranging from subframe $(n-n_{CQI\_ref}-n_{rep}+1)$ to subframe $(n-n_{CQI\_ref})$, where subframe n is the subframe index of CSI reporting, and $n_{CQI\_ref}$, usually=4, depends on CSI reporting mode, and $n_{rep}$ is the number of repetitions corresponding to the CQI value.

A special subframe may be understood as a DL-UL transition subframe in a TDD system.

Figure 4:
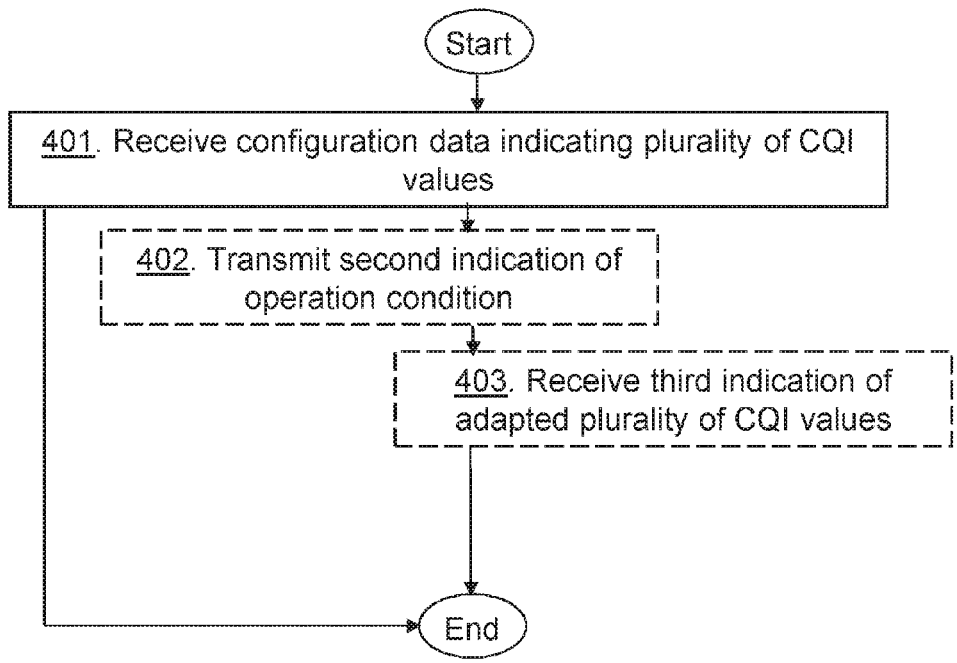
FIG. 4 is a flowchart depicting embodiments of a method in a wireless device, according to embodiments herein.

In some embodiments, the CSI reference resource may be further defined by a set of $n_{rep}$ DL or special subframes where the last subframe is subframe $n-n_{CQI\_ref}$, wherein subframe n is the subframe index of CSI reporting, and $n_{CQI\_ref}$ depends on the CSI reporting mode, and wherein $n_{rep}$ is the number of repetitions corresponding to the CQI value. A definition for subframe index of CSI reporting, for CSI process, and for CSI reporting mode may found e.g., in 3GPP TS 36.213 v12.0.0, Embodiments of method performed by the wireless device 120 for the receiving configuration data from the radio node 101, will now be described with reference to the flowchart depicted in FIG. 4. As stated earlier, the radio node 101 and the wireless device 120 operate in the wireless communication network 100.

The detailed description of some of the following corresponds to the same references provided above, in relation to the actions described for the radio node 101, and will thus not be repeated here.

The method may comprise the following actions, which actions may as well be carried out in another suitable order than that described below.

Action 401

In this Action, the wireless device 120 receives the configuration data from the radio node 101. This may be the result of the configuration described earlier in Action 301. The configuration data indicates configuration for the plurality of CQI values, e.g., at the wireless device. Each CQI value of the plurality of CQI values is associated with the first indication for the number of repetitions of data transmission. That is, each CQI value of the plurality of CQI values is associated with the first indication that the data transmission is repeatedly transmitted towards the wireless device 120. Each CQI value of the plurality of CQI values may be configured in association with the indication of spectral efficiency. The indication of spectral efficiency may be calculated based on the repetition of information across the plurality of radio resources in time. The wireless device 120 may receive the configuration data from the radio node 101 via the signal sent from the radio node 101, as described earlier, e.g., the RRC message.

In some embodiments, the first indication for the number of repetitions of data transmission may provide or comprise the set of numbers of repetitions of data transmission.

Action 402

In this Action, the wireless device 120 may transmit an indication, the second indication, to the radio node 101 for the operation condition of the wireless device 120 relating to coverage. As described earlier, the operation condition may be relating to one of: normal coverage and enhanced coverage.

In some embodiments, the second indication may be a parameter called $I_{coverage}$, which will be described later. For example, the configuration parameter $I_{coverage}$ may take several values. Instead of two values ($I_{coverage}$='normal' and $I_{coverage}$='enhanced'), $I_{coverage}$ may be configured to indicate one out of several CQI tables corresponding to different coverage enhancement levels, e.g. $I_{coverage}$='normal', $I_{coverage}$='somewhat enhanced', $I_{coverage}$='very enhanced', and $I_{coverage}$='extremely enhanced', or, alternatively, $I_{coverage}=\{0, 1, 2, 3\}$).

The wireless device 120 may transmit the second indication to the radio node 101 by sending the message described in Action 302, which may be embedded, for example, in code, time, or frequency resource that the wireless device 120 may have selected to transmit PRACH message to the radio node 101, e.g. via the radio link 140.

Action 403.

The wireless device 120 may then receive an indication, the third indication, of the adapted plurality of CQI values from the radio node 101, as described in Action 403, e.g., via the radio link 140. The adapted plurality of CQI values being may be plurality of CQI values adapted according to the operation condition of the wireless device 120.

In some embodiments, the operation condition may be related to the channel quality value, e.g., a channel quality of one value out of a set of values. The plurality of CQI values may comprise multiple sets of CQI values. In such embodiments, the third indication from the radio node 101 may indicate to use one set of the multiple sets of CQI values. In such embodiments, the one set of the multiple sets of CQI values may have been selected based on the channel quality value. In some embodiments, the multiple sets of CQI values may overlap.

The operation condition may be one of: channel quality under the threshold and channel quality over the threshold. The wireless device 120 may then receive the third indication from the radio node 101, wherein the third indication may be to use the first set of the plurality of CQI values when the operation condition is of channel quality under the threshold, and to use the second set of the plurality of CQI values when the operation condition is of channel quality over the threshold.

The configured plurality of CQI values may comprise 16 values, all of which may be configured in association with QPSK modulation. In other embodiments, the configured plurality of CQI values may comprise 32 values, all of which may be configured in association with QPSK modulation.

In some embodiments, the wireless device 120 may transmit the CQI value to the radio node 101 according to the value of the configured plurality of CQI values. The transmitted CQI value may be based on the CSI reference resource in time domain defined by the one or more downlink or special subframes.

As discussed earlier, the CSI reference may be further defined by the set of $n_{rep}$ DL or special subframes where the last subframe is subframe n-$n_{CQI\_ref}$, wherein subframe n is the subframe index of CSI reporting, and $n_{CQI\_ref}$ depends on the CSI reporting mode, and wherein $n_{rep}$ is the number of repetitions corresponding to the CQI value.

Based on an unrestricted observation interval in time and frequency, the wireless device 120 may derive for each CQI value reported in the UL subframe n the highest CQI index e.g. between 1 and 15 in the CQI definition table which satisfies the following condition, or CQI index 0 if CQI index 1 does not satisfy the condition:

A single PDSCH transport block with a combination of modulation scheme and transport block size corresponding to the CQI index, and occupying a group of DL physical resource blocks and a number of DL subframes termed the CSI reference resource, could be received with a transport block error probability not exceeding 0.1.

Examples of the different methods may be used to provide a new CQI definition for enhanced coverage according to embodiments herein are provided below. In the examples below the wireless device 120 is an MTC UE with the characteristics thereof.

Example Method 1:

For the wireless device 120, operating with enhanced coverage, the higher-order modulation, e.g. 16QAM and 64QAM, entries in the CQI Table 1 may no longer be useful. The CQI indices of 7-15, which correspond to the 16-QAM and 64-QAM modulation, may be removed. A new set of entries, the plurality of CQI values, of QPSK with low spectral efficiency may be added by Action 301 and Action 401. To maintain the same 4-bit size of CQI definition, 9 new entries may be added. One example of such CQI design is shown in Table 2. Table 2 depicts a 4-bit CQI Table for enhanced coverage, which may be configured by the radio node 101 in accordance with Action 301. The plurality of CQI values may be understood as the whole set of CQI indices in Table 2, in some embodiments, or as entries 1-9 in Table 2, which are the new entries, in other embodiments. In this particular example, the first indication for the number of repetitions of data transmission may be understood as the radio node 101 signalling to the wireless device 120 to use Table 2 instead of Table 1.

Table 2-1 shows an example of a 4-bit CQI Table for enhanced coverage with an alternative way of ordering the CQI index, with respect to that shown in FIG. 2. Table 2-1 will be described later. The plurality of CQI values may be understood as the whole set of CQI indices in Table 2-1, in some embodiments, or as entries 7-15 in Table 2, which are the new entries, in other embodiments.

Using this method, only one configuration parameter $I_{coverage}$ may be needed to indicate, action 402, if the wireless device 120 is in normal coverage or enhanced coverage, and the wireless device 120, and the radio node 101 may then use the CQI definition correspondingly, e.g, by the radio node 101 adapting the configured plurality of CQI values as described in Action 303.

Hence, in some embodiments, the second indication described in Action 302 may be $I_{coverage}$. One example to use $I_{coverage}$ may be, When $I_{coverage}$='normal', then the CQI is reported by the wireless device 120 in Action 402, and interpreted by the radio node 101, according to Table 1 in Action 303;

When $I_{coverage}$='enhanced', then the CQI is reported by the wireless device 120 in Action 402, and interpreted by the radio node 101, according to Table 2 in Action 303;

The advantage of this method is that the CQI definition may be used as before, i.e., 4 bits may be used to index the CQI table. No additional signaling may be necessary other than $I_{coverage}$. Note that $I_{coverage}$ may not be defined to support CQI only. Rather, $I_{coverage}$ may be a high-level configuration parameter that may affect many aspects of DL and UL operation. Hence, $I_{coverage}$ may not be considered overhead for CQI purposes.

However, this method may have the disadvantage of a relatively coarse resolution over a wide range of channel conditions. This may result in a sparsely available number of repetitions in time, as in contrast to consecutively available number of repetitions. This is illustrated in Table 3. Table 3 shows the number of repetitions (# repetition) of the PDSCH corresponding to new CQI indices of 1-9 for enhanced coverage. Table 3 is made with the assumption that the PDSCH is mapped onto 6 PRBs, in frequency domain, and multiple subframes for repetition in time domain, with number of Transport Block (TB) bits K∈{152, 328, 504, 1000}. The plurality of CQI values may be understood as the whole set of CQI indices in Table 3, in some embodiments, or as CQI indices 1-9 in Table 3, which are the new entries, in other embodiments For a given measurement time, it may be difficult to achieve the same accuracy in the channel quality estimation over the entire range of the CQI table. Considering the difficulties to estimate the channel quality with good accuracy at very low operating points, that is, with very low signal-to-noise radio, corresponding to very bad channel quality, it may be sufficient to express the lower CQI values with a relatively coarse resolution of spectral efficiency. If the granularity of the CQI table is made coarser in one end of the CQI table, then the granularity may be made finer in the other end of the CQI table.

Example Method 2:

In Example Method 2, the CQI definition, as configured in Action 302, may be expanded beyond 4-bit, i.e., 16-entries. This may be helpful in providing denser number of repetitions in time, where the number of repetitions may correspond to more closely spaced spectral efficiency values. This is illustrated with a 5-bit, i.e., 32-entry, CQI definition in Table 4 for enhanced coverage. In this case, 25 new CQI entries may be added by the configuring of Action 301 to provide a channel condition indication for UEs, such as the wireless device 120, in enhanced coverage. The plurality of CQI values may be understood as the whole set of CQI indices in Table 4, in some embodiments, or as entries 1-25 in Table 4, which are the new entries, in other embodiments. Thus, finer granularity of channel conditions may be indicated.

While the 5-bit CQI table may be used straight-forwardly, if the CQI report may be expanded to allow 5 bits for a CQI entry, this may be difficult due to the need to change UL CSI report formats extensively.

Instead, in Action 303, a separate signal may be used to indicate in a semi-static manner which sub-section of the 5-bit CQI table may be used. For example, a one-bit $I_{CQI}$ may be defined as the second indication received in Action 302. Note that $I_{CQI}$ may be defined in addition to $I_{coverage}$, and $I_{CQI}$ may be used only when $I_{coverage}$='enhanced'.

In one example, according to Action 303, the radio node 101 may configure $I_{CQI}$=0 for wireless devices, such as the wireless device 120, in the worse coverage, and $I_{CQI}$=1 for wireless devices in the better coverage. Worse coverage may be understood as a channel quality under the threshold described earlier, which threshold may be defined, e.g., by the operator. Better coverage may be understood as channel quality over the threshold.

When $I_{CQI}$=0, the 16 entries in the lower efficiency end of the 5-bit CQI table may be taken, according to Action 303. That is, the CQI index may be interpreted using a 16-entry derived table, which is composed of CQI index 0-15 of Table 4.

When $I_{CQI}$=1, the 16 entries in the higher efficiency end of the 5-bit CQI table may be taken, according to Action 303. That is, the CQI index may be interpreted using a 16-entry derived table, which is composed of CQI index {0, 17-31} of Table 4.

Other variations may be possible. For example, a 2-bit $I_{CQI}$ may be defined. The radio node 101, e.g., an eNB, may configure, according to Action 303, $I_{CQI}$=0 for UEs in the worse coverage at one end, and $I_{CQI}$=3 for UEs in the better coverage at the other end. The derived CQI table corresponding to $I_{CQI} \in \{0, 1, 2, 3,\}$ may overlap.

When $I_{CQI}$=0, the 16 entries in the lower efficiency end of the 5-bit CQI table may be taken, according to Action 303. That is, the CQI index may be interpreted using a 16-entry derived table, which is composed of CQI index 0-15 of Table 4.

When $I_{CQI}$=1, the CQI index may be interpreted using a 16-entry derived table, which is composed of CQI index {0, 6-20} of Table 4, according to Action 303.

When $I_{CQI}$=2, the CQI index may be interpreted using a 16-entry derived table, which is composed of CQI index {0, 12-26} of Table 4, according to Action 303.

When $I_{CQI}$=3, the 16 entries in the higher efficiency end of the 5-bit CQI table may be taken, according to Action 303. That is, the CQI index may be interpreted using a 16-entry derived table, which is composed of CQI index {0, 17-31} of Table 4.

The $I_{CQI}$ indicator may be assigned, taking account of a range of factors.

In one aspect, the useful range of CQI, that is, the plurality of CQI values the wireless device 120 may use to derive the CQI report may depend on the system bandwidth. This is because the wireless device 120 may be capable of receiving 6 Physical Resource Block (PRBs) on the DL, regardless of the system bandwidth. For a given eNB transmit power level, e.g., 46 DeciBel-milliwatts (dBm), when the system bandwidth may be wide, proportionally the amount of DL transmit power allocated to 6 PRBs may be expected to be smaller. In this case, CQI definitions of lower spectral efficiency may be appropriate.

In another aspect, the channel condition between the radio node 101 and the wireless device 120 may be used to determine the $I_{CQI}$ indicator, as described earlier in Action 302. UEs in poorer channel condition may be matched with CQI definitions with lower spectral efficiency. Hence, using the 1-bit $I_{CQI}$ above as an example, in Action 303, $I_{CQI}$=0 may be configured when the RSRP/Reference Signal Received Quality (RSRQ) is below a certain threshold, e.g., the threshold described above, and $I_{CQI}$=1 may be configured when the RSRP/RSRQ is above the certain threshold.

In another aspect, the capability of the wireless device 120, a UE capability, may be taken into account according to Action 303, as described earlier.

Example Hybrid Methods:

Combinations of Example Method 1 and Example Method 2 may also be envisioned.

For example, the configuration parameter $I_{coverage}$, which is an example of the second indication, may take several values. Instead of two values ($I_{coverage}$='normal' and $I_{coverage}$='enhanced'), $I_{coverage}$ may be configured to indicate one out of several CQI tables corresponding to different coverage enhancement levels, e.g. $I_{coverage}$='normal', $I_{coverage}$='somewhat enhanced', $I_{coverage}$='very enhanced', and $I_{coverage}$='extremely enhanced' (or, alternatively, $I_{coverage}$={0, 1, 2, 3}). The one out of the several CQI tables is an example of the adapted plurality of CQI values resulting from Action 303.

In this way, the high granularity of Example Method 2 may be achieved with the low overhead of Example Method 1. The wireless device 120 may not be able to switch as quickly to another CQI table when the channel quality is getting out of range of the currently configured CQI table.

Examples of CQI Definition Table for MTC UEs

Examples of CQI definition Tables that may be used in the methods described herein are provided below. The configured plurality of CQI values may be any of the Tables described below, or it may be a selected group of CQI values of any of the Tables described below, relating to the number of repetitions of data transmission.

First, a design of 4-bit CQI definition table is provided in the examples of Table 2, Table 2-1, Table 3 and Table 4, that may be used in Example Method 1. Second, a design of 5-bit CQI definition table is provided the examples of Table 5 and Table 6, that may be used with Example Method 2.

Four-bit CQI Definition for Enhanced Coverage

For a UE operating with enhanced coverage such as the wireless device 120 in some embodiments, as described earlier, the higher-order modulation, 16QAM and 64QAM, entries in the CQI table of existing methods, e.g., Table 1, are no longer useful. The CQI indices of 7-15 may be removed from Table 1, which corresponds to the 16-QAM and 64-QAM modulation. A new set of entries of QPSK with low spectral efficiency, an example of the plurality of CQI values, may be added in Action 301.

Assuming the new CQI index=1 has spectral efficiency equivalent to 1/64 of the spectral efficiency of CQI index 1 in Table 1, the CQI table for enhanced coverage may be derived and shown in Table 2.

Figure 5:
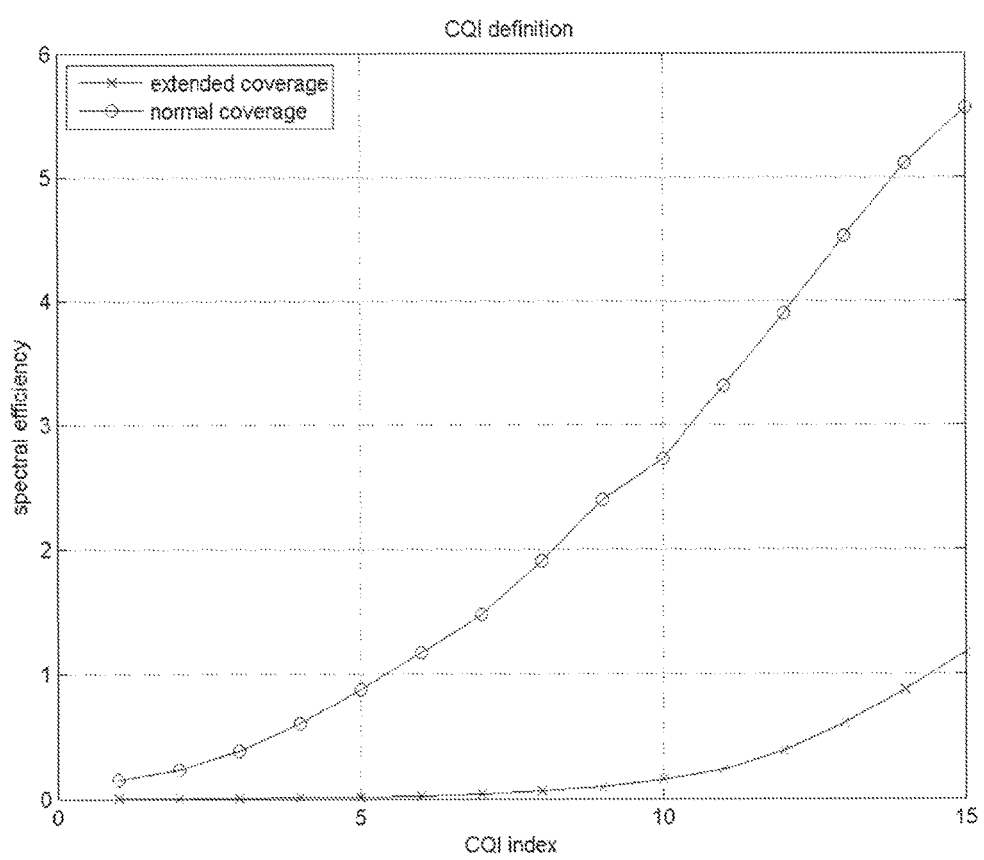
FIG. 5 is a schematic illustration of spectral efficiency according to embodiments herein.

The spectral efficiency of Table 2 is plotted together with that of Table 1 in FIG. 5. FIG. 5 is a graphic representation of spectral efficiency defined in the 4-bit CQI tables for normal coverage using Table 1, line with circles, and enhanced coverage using Table 2, line with crosses, according to embodiments herein. A 4-bit CQI value to report to the radio node 101 may provide one of 16 possible CQI values. For normal coverage mode, the set of CQI values have higher spectral efficiency than those for the set of CQI values for enhanced coverage. As shown in the Figure, for UEs experiencing extended coverage, the set of CQI values for enhanced coverage is more useful, since the entries in Table 1 for the values of higher efficiency, e.g., CQI index 7-15 of Table 1, are not useful to report CQI in a context of extended coverage.

Figure 6:
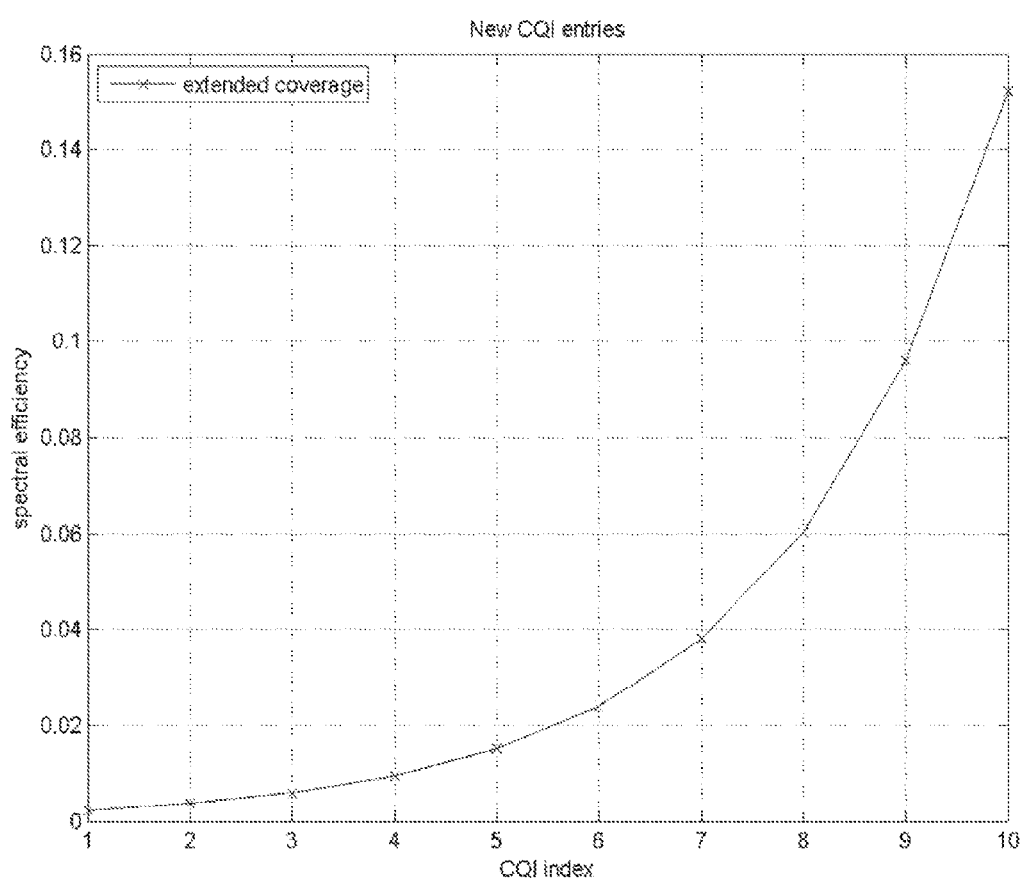
FIG. 6 is a schematic illustration of low spectral efficiency according to embodiments herein.

For clarity, FIG. 6 is zoomed in a part of FIG. 5, to show the lowest spectral efficiency entries of Table 2. FIG. 6 is a graphic representation of the entries of low spectral efficiency defined in the new 4-bit CQI table for enhanced coverage, according to embodiments herein. As shown in the Figure, these newly added CQI values may have very low spectral efficiency, hence providing lower identifiable spectral efficiency values and higher granularity for reporting CQI in the context of enhanced coverage, when spectral efficiency is very low.

In Table 3, the number of repetitions in time is shown for K∈{152, 328, 504, 1000}, where K is the TB size. In this table, a CQI index of 10 corresponds to the CQI index of 1 in Table 1. The assumptions are: 6 PRBs for DL transmission in a subframe, 3 OFDM symbols for the control region, and one antenna port. These K values may be used as an example to illustrate the set of PDSCH repetitions corresponding to the spectral efficiencies.

TABLE 2

| CQI index | modulation | code rate × 1024 | efficiency |
|---|---|---|---|
| 0 | | out of range | |
| 1 | QPSK | 1 | 0.0024 |
| 2 | QPSK | 2 | 0.0038 |
| 3 | QPSK | 3 | 0.0060 |
| 4 | QPSK | 5 | 0.0095 |
| 5 | QPSK | 8 | 0.0151 |
| 6 | QPSK | 12 | 0.0240 |
| 7 | QPSK | 19 | 0.0381 |
| 8 | QPSK | 31 | 0.0604 |
| 9 | QPSK | 49 | 0.0959 |
| 10 | QPSK | 78 | 0.1523 |
| 11 | QPSK | 120 | 0.2344 |
| 12 | QPSK | 193 | 0.3770 |
| 13 | QPSK | 308 | 0.6016 |
| 14 | QPSK | 449 | 0.8770 |
| 15 | QPSK | 602 | 1.1758 |

TABLE 2-1

| CQI index | modulation | code rate × 1024 | efficiency |
|---|---|---|---|
| 0 | | out of range | |
| 1 | QPSK | 78 | 0.1523 |
| 2 | QPSK | 120 | 0.2344 |

TABLE 2-1-continued

| CQI index | modulation | code rate × 1024 | efficiency |
|---|---|---|---|
| 3 | QPSK | 193 | 0.3770 |
| 4 | QPSK | 308 | 0.6016 |
| 5 | QPSK | 449 | 0.8770 |
| 6 | QPSK | 602 | 1.1758 |
| 7 | QPSK | 1 | 0.0024 |
| 8 | QPSK | 2 | 0.0038 |
| 9 | QPSK | 3 | 0.0060 |
| 10 | QPSK | 5 | 0.0095 |
| 11 | QPSK | 8 | 0.0151 |
| 12 | QPSK | 12 | 0.0240 |
| 13 | QPSK | 19 | 0.0381 |
| 14 | QPSK | 31 | 0.0604 |
| 15 | QPSK | 49 | 0.0959 |

TABLE 3

| CQI index | efficiency | # repetition | | | |
|---|---|---|---|---|---|
| | | K = 152 | K = 328 | K = 504 | K = 1000 |
| 1 | 0.0024 | 84 | 182 | 280 | 556 |
| 2 | 0.0038 | 53 | 115 | 176 | 350 |
| 3 | 0.0060 | 34 | 72 | 111 | 221 |
| 4 | 0.0095 | 21 | 46 | 70 | 139 |
| 5 | 0.0151 | 13 | 29 | 44 | 88 |
| 6 | 0.0240 | 8 | 18 | 28 | 55 |
| 7 | 0.0381 | 5 | 11 | 18 | 35 |
| 8 | 0.0604 | 3 | 7 | 11 | 22 |
| 9 | 0.0959 | 2 | 5 | 7 | 14 |
| 10 | 0.1523 | 1 | 3 | 4 | 9 |

Table 5 depicts another example of a 4-bit CQI table indicating the CQI index to use for enhanced coverage, if the desired number of repetitions, e.g., given the characteristics of the wireless device 120, are {1, 20, 40, 80, 100}. The assumption for Table 4 is 6 PRBs with number of TB bits K∈{152, 328, 504, 1000}. In Table 5, assuming K∈{152, 328, 504, 1000}, and the target number of repetitions are {1, 20, 40, 80}, the CQI index to select is shown in the "CQI index to use column". In Table 5, the "#code bits" column indicates the number of code bits generated for the transport block. The "#TB bits" column indicates the number of bits in the transport block. The number of repetitions of data transmission is indicated in the "#repetition" column. Here, 1 repetition means there is only one transmission, i.e., not repeated in time. For each entry, the efficiency is shown, as described before, without (w/o) repetition, and with (w/) repetition. This indicates the spectral efficiency corresponding to the modulation, coding rate, and number of repetitions. In this example, the plurality of CQI values may be understood as the whole set of CQI indices in Table 5, in some embodiments.

Note that the CQI entries of e.g., modulation, code rate, may be ordered in ways other than shown in Table 2. In Table 2-1, an alternative way to list the CQI entries of e.g., modulation, code rate is illustrated, where the low code rate entries are listed after the higher code rate CQI entries. Other ways to order the CQI entries may be possible as well. Note that efficiency is a derived value of e.g., modulation, code rate, hence the ordering of efficiency is according to the order of e.g., modulation, code rate. While the 4-bit CQI table is used to illustrate the different ordering of CQI entries, the same principle may be applied to the 5-bit CQI table.

Five-bit CQI Definition for Enhanced Coverage

Assuming the new CQI index=1 has spectral efficiency equivalent to 1/64 of the spectral efficiency of CQI index 0 in Table 1, the 5-bit CQI table for enhanced coverage is derived and shown in Table 4, which has been described earlier in the Example Method 2. Table 4 is equivalent to Table 2, but it is a five-bit table.

Figure 7:
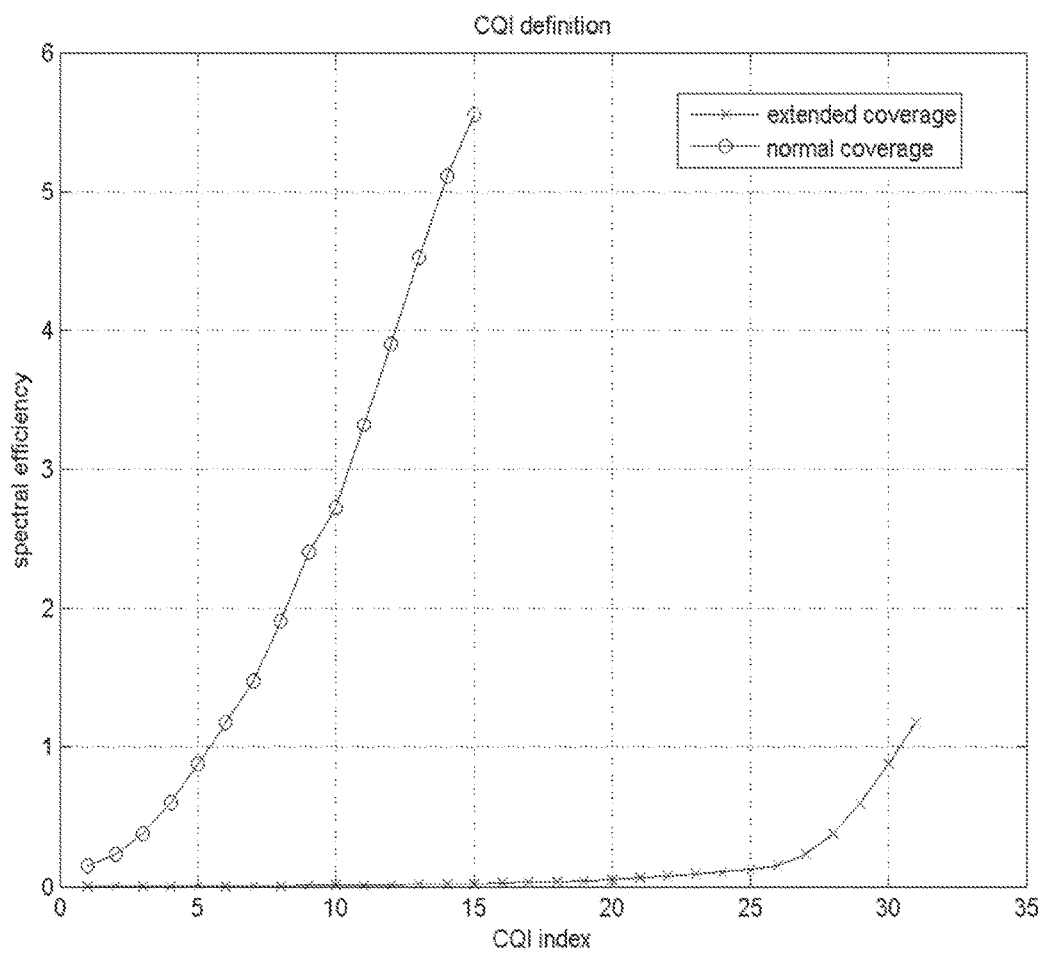
FIG. 7 is a schematic illustration of spectral efficiency according to embodiments herein.

The spectral efficiency of Table 4 is plotted together with that of Table 1 in FIG. 7. FIG. 7 is a graphic representation of spectral efficiency defined in the 5-bit CQI table for normal coverage, line with circles, enhanced coverage, line with crosses, according to embodiments herein. The spectral efficiencies used for extended coverage may be much lower than those of extended coverage. As shown in the Figure, for UEs experiencing extended coverage, the set of CQI values for enhanced coverage is more useful, since the entries in Table 1 for the values of higher efficiency, e.g., CQI index 7-15 of Table 1, are not useful to report CQI in a context of extended coverage.

Figure 8:
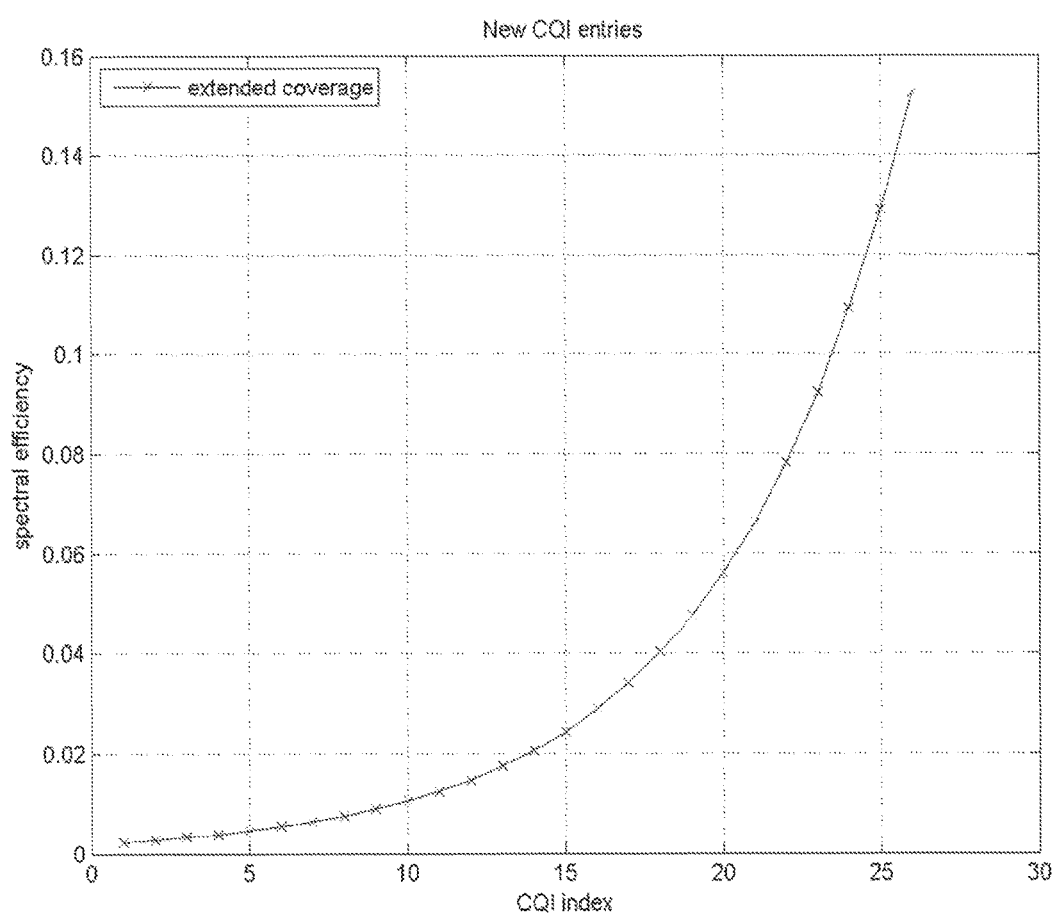
FIG. 8 is a schematic illustration of low spectral efficiency according to embodiments herein.

For clarity, FIG. 8 is zoomed in on FIG. 7 to show the lowest spectral efficiency entries of Table 4. FIG. 8 is a graphic representation of the entries of low spectral efficiency defined in the new 5-bit CQI table for enhanced coverage, according to embodiments herein. As shown in the Figure, note that densely defined spectral efficiencies values are provided by the 5-bit CQI design.

Table 6 shows another example of a five-bit CQI table, according to embodiments herein, depicting the number of repetitions corresponding to new CQI indices of 1-25 for enhanced coverage. In Table 6, the number of repetitions in time is shown for K∈{152, 328, 504, 1000}, where K is the TB size in bits. In this table, CQI index of 26 corresponds to CQI index of 1 in Table 1. The assumptions are: 6 PRBs for DL transmission in a subframe, 3 OFDM symbols for the control region, and one antenna port. Table 6 is equivalent to Table 3, but it is a five-bit table. The plurality of CQI values

TABLE 4

| CQI index | modulation | code rate × 1024 | efficiency |
|---|---|---|---|
| 0 | | out of range | |
| 1 | QPSK | 1 | 0.0024 |
| 2 | QPSK | 1 | 0.0028 |
| 3 | QPSK | 2 | 0.0033 |
| 4 | QPSK | 2 | 0.0039 |
| 5 | QPSK | 2 | 0.0046 |
| 6 | QPSK | 3 | 0.0055 |
| 7 | QPSK | 3 | 0.0065 |
| 8 | QPSK | 4 | 0.0076 |
| 9 | QPSK | 5 | 0.0090 |
| 10 | QPSK | 5 | 0.0106 |
| 11 | QPSK | 6 | 0.0126 |
| 12 | QPSK | 8 | 0.0148 |
| 13 | QPSK | 9 | 0.0175 |
| 14 | QPSK | 11 | 0.0207 |
| 15 | QPSK | 13 | 0.0244 |
| 16 | QPSK | 15 | 0.0289 |
| 17 | QPSK | 17 | 0.0341 |
| 18 | QPSK | 21 | 0.0402 |
| 19 | QPSK | 24 | 0.0475 |
| 20 | QPSK | 29 | 0.0561 |
| 21 | QPSK | 34 | 0.0663 |
| 22 | QPSK | 40 | 0.0783 |
| 23 | QPSK | 47 | 0.0925 |
| 24 | QPSK | 56 | 0.1092 |
| 25 | QPSK | 66 | 0.1290 |
| 26 | QPSK | 78 | 0.1523 |
| 27 | QPSK | 120 | 0.2344 |
| 28 | QPSK | 193 | 0.3770 |
| 29 | QPSK | 308 | 0.6016 |
| 30 | QPSK | 449 | 0.8770 |
| 31 | QPSK | 602 | 1.1758 |

TABLE 5

| # code bits | # TB bits | # repetition | efficiency w/o repetition | efficiency w/ repetition | CQI index to use |
|---|---|---|---|---|---|
| 1512 | 152 | 1 | 0.2011 | 0.2011 | 10 |
| 1512 | 328 | 1 | 0.4339 | 0.4339 | 12 |
| 1512 | 504 | 1 | 0.6667 | 0.6667 | 13 |
| 1512 | 1000 | 1 | 1.3228 | 1.3228 | 15 |
| 1512 | 152 | 20 | 0.2011 | 0.0101 | 4 |
| 1512 | 328 | 20 | 0.4339 | 0.0217 | 5 |
| 1512 | 504 | 20 | 0.6667 | 0.0333 | 6 |
| 1512 | 1000 | 20 | 1.3228 | 0.0661 | 8 |
| 1512 | 152 | 40 | 0.2011 | 0.0050 | 2 |
| 1512 | 328 | 40 | 0.4339 | 0.0108 | 4 |
| 1512 | 504 | 40 | 0.6667 | 0.0167 | 5 |
| 1512 | 1000 | 40 | 1.3228 | 0.0331 | 6 |
| 1512 | 152 | 80 | 0.2011 | 0.0025 | 1 |
| 1512 | 328 | 80 | 0.4339 | 0.0054 | 2 |
| 1512 | 504 | 80 | 0.6667 | 0.0083 | 3 |
| 1512 | 1000 | 80 | 1.3228 | 0.0165 | 5 |
| 1512 | 152 | 100 | 0.2011 | 0.0020 | 0 (out of range) |
| 1512 | 328 | 100 | 0.4339 | 0.0043 | 2 |
| 1512 | 504 | 100 | 0.6667 | 0.0067 | 3 |
| 1512 | 1000 | 100 | 1.3228 | 0.0132 | 4 | may be understood as the whole set of 32 CQI indices in Table 6, in some embodiments, or as entries 1-25 in Table 6, which are the new entries, in other embodiments.

Embodiments herein provide the advantage that they allow a narrow-band MTC UE, as an example of the wireless device 120, to operate in a legacy LTE system with wider system bandwidth, and to be able to report CQI with a range that matches the possibility of repeating PDSCH, where the number of repetitions may range from 1 to tens, or hundreds, or thousands. For example, the system bandwidth may be 20 MHz, i.e., 100 PRBs, while the wireless device 120 may only transmit and receive over at most 6 PRB. This is a feature to enable low-cost implementation of the UE.

Figure 9:
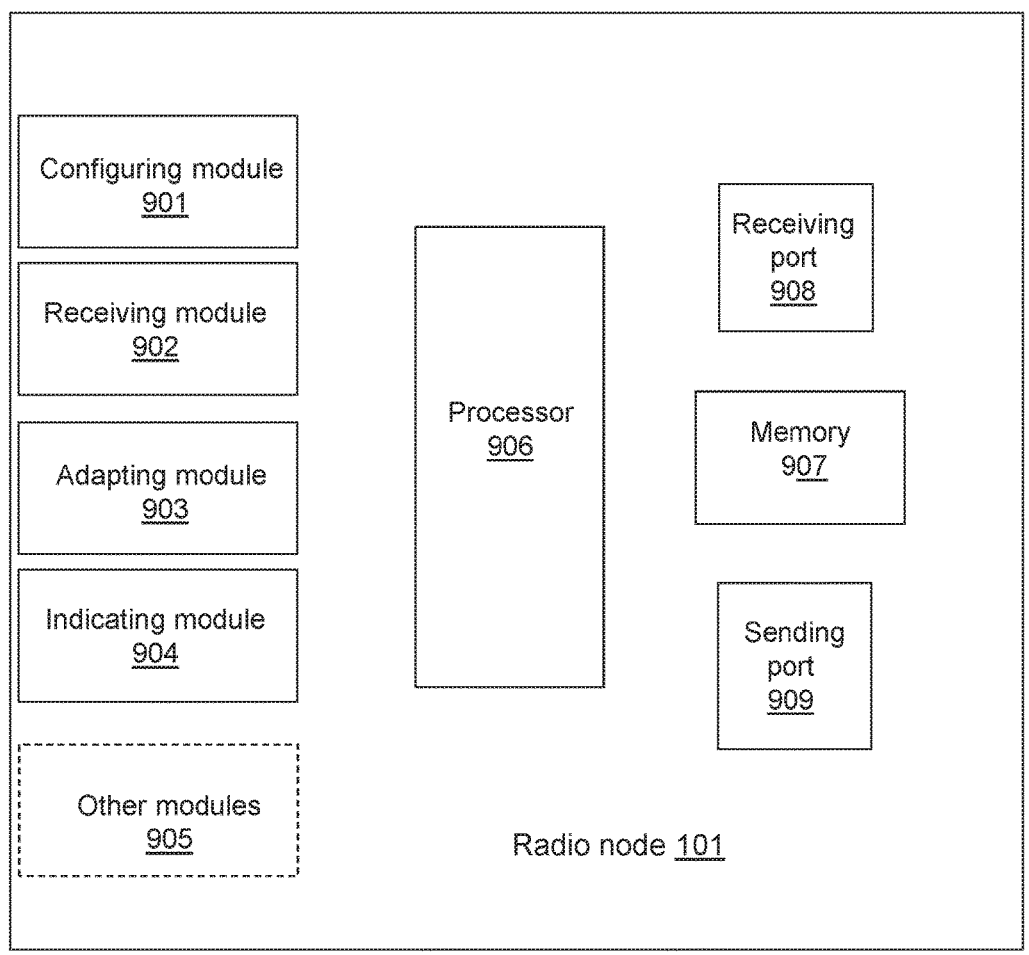
FIG. 9 is a schematic block diagram illustrating embodiments of a radio node, according to embodiments herein.

The radio node 101 configured to perform the methods above is herein provided. FIG. 9 discloses the radio node 101 configured to configure the plurality of CQI values. As already mentioned, the radio node 101 and the wireless device 120 are configured to operate in the wireless communication network 100.

The detailed description of some of the following corresponds to the same references provided above, in relation to the actions described for the radio node 101, and will thus not be repeated here.

The radio node 101 may comprise a configuring module 901 and/or a processor 906. The radio node 101, the configuring module 901 and/or the processor 906 may be configured to configure the plurality of CQI values, each of the plurality of CQI values being configured in association with the first indication for the number of repetitions of data transmission. That is, each CQI value of the plurality of CQI values may be associated with the first indication that the data transmission is, or is needed to be, repeatedly transmitted towards the wireless device 101.

In some embodiments, the radio node 101 may be configured to configure the wireless device 120 configured to operate in the wireless communication network 100, with the plurality of CQI values.

TABLE 1

| CQI index | efficiency | # repetition | | | |
|---|---|---|---|---|---|
| | | K = 152 | K = 328 | K = 504 | K = 1000 |
| 1 | 0.0024 | 84 | 182 | 280 | 556 |
| 2 | 0.0028 | 72 | 154 | 237 | 471 |
| 3 | 0.0033 | 61 | 131 | 201 | 399 |
| 4 | 0.0039 | 51 | 111 | 170 | 337 |
| 5 | 0.0046 | 43 | 94 | 144 | 286 |
| 6 | 0.0055 | 37 | 79 | 122 | 242 |
| 7 | 0.0065 | 31 | 67 | 103 | 205 |
| 8 | 0.0076 | 26 | 57 | 87 | 173 |
| 9 | 0.0090 | 22 | 48 | 74 | 147 |
| 10 | 0.0106 | 19 | 41 | 63 | 124 |
| 11 | 0.0126 | 16 | 35 | 53 | 105 |
| 12 | 0.0148 | 14 | 29 | 45 | 89 |
| 13 | 0.0175 | 11 | 25 | 38 | 76 |
| 14 | 0.0207 | 10 | 21 | 32 | 64 |
| 15 | 0.0244 | 8 | 18 | 27 | 54 |
| 16 | 0.0289 | 7 | 15 | 23 | 46 |
| 17 | 0.0341 | 6 | 13 | 20 | 39 |
| 18 | 0.0402 | 5 | 11 | 17 | 33 |
| 19 | 0.0475 | 4 | 9 | 14 | 28 |
| 20 | 0.0561 | 4 | 8 | 12 | 24 |
| 21 | 0.0663 | 3 | 7 | 10 | 20 |
| 22 | 0.0783 | 3 | 6 | 9 | 17 |
| 23 | 0.0925 | 2 | 5 | 7 | 14 |
| 24 | 0.1092 | 2 | 4 | 6 | 12 |
| 25 | 0.1290 | 2 | 3 | 5 | 10 |
| 26 | 0.1523 | 1 | 3 | 4 | 9 |

In some embodiments, the configured plurality of CQI values may comprise 16 values, all of which may be configured in association with QPSK modulation. In other embodiments, the configured plurality of CQI values may comprise 32 values, all of which may be configured in association with QPSK modulation. The configuration may be performed according to a signal sent from the radio node 101 or a signal sent from the wireless device 120.

The CQI values may be configured in association with an indication, being an example of the first indication, of spectral efficiency, the indication of spectral efficiency being calculated based on repetition of information across a plurality of radio resources in time. The first indication may indicate the number of repetitions of the data transmission and in some embodiments, the first indication for the number of repetitions of data transmission may provide the set of numbers of repetitions of data transmission.

The radio node 101 may comprise a receiving module 902. The radio node 101, the receiving module 902, and/or the processor 906 may be configured to receive an indication, e.g., the second indication, from the wireless device 120 for the operation condition of the wireless device 120 relating to coverage.

In some embodiments, the CQI value received from the wireless device 120 according to the value of the configured plurality of CQI values may be based on the CSI reference resource in time domain which may be configured to be defined by the one or more DL or special subframes. The radio node 101, the receiving module 902, and/or the processor 906 may be configured to receive the CQI value from the wireless device 120.

In some embodiments, the CSI reference resource may be further configured to be defined by the set of $n_{rep}$ DL or special subframes where the last subframe is subframe n-$n_{CQI\_ref}$, wherein subframe n is the subframe index of CSI reporting, and $n_{CQI\_ref}$ depends on the CSI reporting mode, and wherein $n_{rep}$ is the number of repetitions corresponding to the CQI value.

The radio node 101 may comprise an adapting module 903. The radio node 101, the adapting module 903, and/or the processor 906 may be configured to adapt the configured plurality of CQI values, or select a part of the plurality of CQI values, according to the received second indication from the wireless device 120.

The operation condition may be related to one of: normal coverage and enhanced coverage.

In some embodiments, the operation condition may be related to a channel quality value. The plurality of CQI values may comprise multiple sets of CQI values, and the radio node 101, the adapting module 903, and/or the processor 906 may be configured to adapt the configured plurality of QCI values.

The radio node 101 may comprise an indicating module 904. The radio node 101, the indicating module 904, and/or the processor 906 may be configured to indicate the adapted plurality of CQI values to the wireless device 120.

To indicate may comprise to configure the wireless device 120 to use the one set of the multiple sets of CQI values. The one set of the multiple sets of CQI values may be configured to have been selected based on the channel quality value. That is, the radio node 101, the indicating module 904, and/or the processor 906 may be configured to indicate the configured plurality of QCI values by configuring the wireless device 120 to use the one set of the multiple sets of CQI values, wherein the one set of the multiple sets of CQI values is selected based on the channel quality value. The multiple sets of CQI values may overlap.

In some embodiments, the operation condition may relate to one of: channel quality under a threshold and channel quality over a threshold. The radio node 101, the indicating module 904, and/or the processor 906 may be configured to adapt the configured plurality of QCI values by configuring the wireless device 120 to use the first set of the plurality of CQI values when the operation condition is of channel quality under the threshold, and to use the second set of the plurality of CQI values when the operation condition is of channel quality over the threshold. The channel quality may be one value out of a set of values.

The radio node 101 may comprise other modules 905 as well.

The embodiments herein may be implemented through one or more processors, such as the processor 906 in the radio node 101 depicted in FIG. 9, together with computer program code for performing the functions and actions of the embodiments herein. The program code mentioned above may also be provided as a computer program product, for instance in the form of a data carrier carrying computer program code for performing the embodiments herein when being loaded into the in the radio node 101. One such carrier may be in the form of a CD ROM disc. It is however feasible with other data carriers such as a memory stick. The computer program code may furthermore be provided as pure program code on a server and downloaded to the radio node 101.

The radio node 101 may further comprise a memory 907, comprising one or more memory units. The memory 907 is arranged to be used to store obtained information, store data, configurations, schedulings, and applications etc. to perform the methods herein when being executed in the radio node 101.

In some embodiments, the radio node 101 may receive information from the wireless device 120 through a receiving port 908. In some embodiments, the receiving port 908 may be, for example, connected to the two or more antennas in radio node 101. In other embodiments, the radio node 101 may receive information from another structure in the wireless communication network 100 through the receiving port 908. Since the receiving port 908 may be in communication with the processor 906, the receiving port 908 may then send the received information to the processor 906. The receiving port 908 may also be configured to receive other information.

The processor 906 in the radio node 101 may be further configured to transmit or send information to e.g., the wireless device 120, through a sending port 909, which may be in communication with the processor 906, and the memory 907.

Those skilled in the art will also appreciate that the modules described above may refer to a combination of analog and digital modules, and/or one or more processors configured with software and/or firmware, e.g., stored in memory, that, when executed by the one or more processors such as the processor 906, perform as described above. One or more of these processors, as well as the other digital hardware, may be included in a single Application-Specific Integrated Circuit (ASIC), or several processors and various digital hardware may be distributed among several separate components, whether individually packaged or assembled into a System-on-a-Chip (SoC).

Also, in some embodiments, the different modules described above may be implemented as one or more applications running on one or more processors such as the processor 906.

Thus, the methods according to the embodiments described herein for the radio node 101 may be respectively implemented by means of a computer program product, comprising instructions, i.e., software code portions, which, when executed on at least one processor, cause the at least one processor to carry out the actions described herein, as performed by the radio node 101. The computer program product may be stored on a computer-readable storage medium. The computer-readable storage medium, having stored thereon the computer program, may comprise instructions which, when executed on at least one processor, cause the at least one processor to carry out the actions described herein, as performed by radio node 101. In some embodiments, the computer-readable storage medium may be a non-transitory computer-readable storage medium, such as a CD ROM disc, or a memory stick. In other embodiments, the computer program product may be stored on a carrier containing the computer program just described, wherein the carrier is one of an electronic signal, optical signal, radio signal, or the computer-readable storage medium, as described above.

Figure 10:
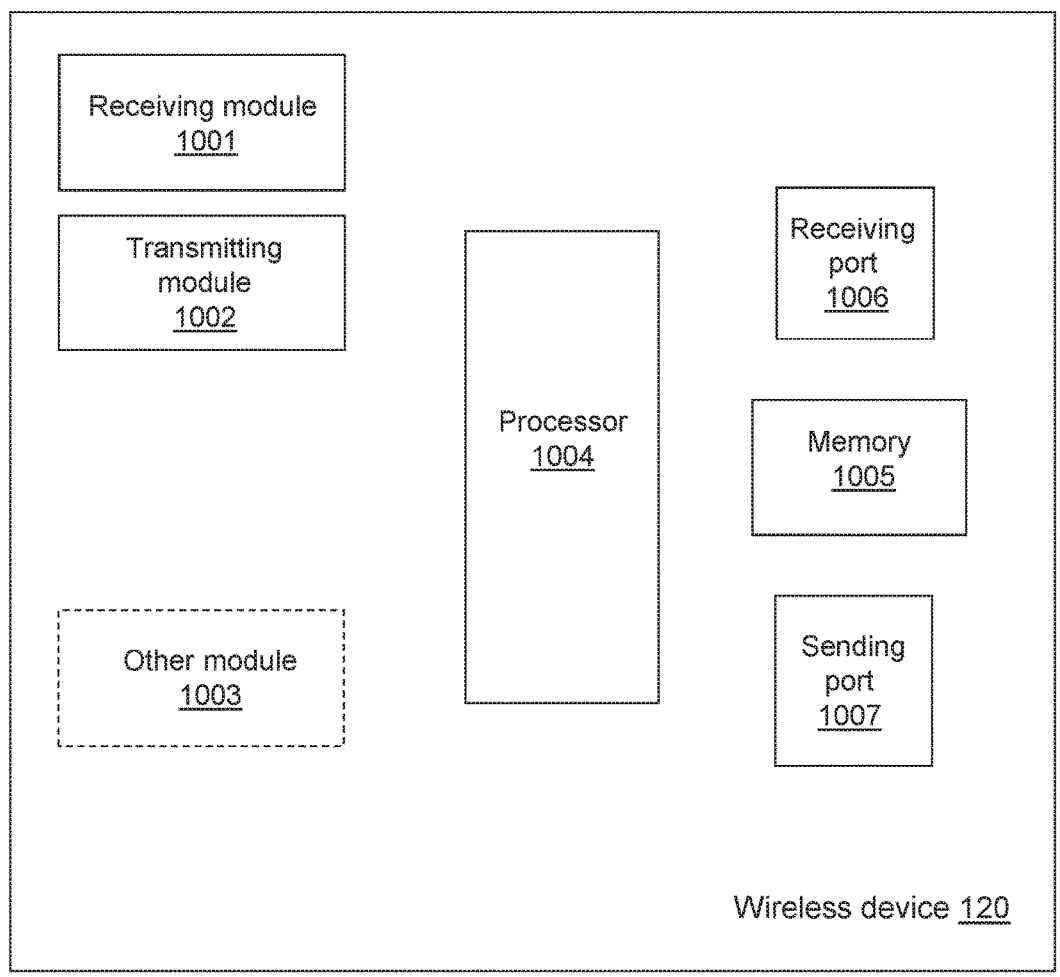
FIG. 10 is a schematic block diagram illustrating embodiments of a wireless device, according to embodiments herein.

In order to perform embodiments herein a wireless device 120 is provided. FIG. 10 shows a block diagram depicting the wireless device 120 configured to receive configuration data from a radio node 101. That is, for configuring the wireless device 120 from the radio node 101. The radio node 101 and the wireless device 120 are configured to operate in the wireless communication network 100.

The wireless device 120 may comprise a receiving module 1001 and/or a processor 1004. The wireless device 120, the receiving module 1001 and/or the processor 1004 may be configured to receive configuration data from the radio node 101, which configuration data is configured to indicate configuration for the plurality of CQI values, at the wireless device 120. Each CQI value of the plurality of CQI values may be associated with the first indication for the number of repetitions of data transmission. That is, each CQI value of the plurality of CQI values may be associated with the first indication that the data transmission is, or is needed to be, repeatedly transmitted towards the wireless device 120. E.g. each CQI value of the plurality of CQI values may be configured in association with the indication of spectral efficiency. The indication of spectral efficiency may be calculated based on repetition of information across the plurality of radio resources in time, or the necessity to repeatedly transmit DL data to the wireless device 120.

The first indication for the number of repetitions of data transmission may be configured to provide, or comprise, the set of numbers of repetitions of data transmission. That is, the first indication may indicate number of repetitions of data transmission.

In some embodiments, the configured plurality of CQI values may comprise 16 values, all of which may be configured in association with QPSK modulation. In other embodiments, the configured plurality of CQI values may comprise 32 values, all of which may be configured in association with QPSK modulation.

The wireless device 120, the receiving module 1001 and/or the processor 1004 may be configured receive an indication, the third indication, of the adapted plurality of CQI values from the radio node 101. The adapted plurality of CQI values may be the plurality of CQI values adapted according to the operation condition of the wireless device 120.

In some embodiments, the operation condition may be related to the channel quality value. For example, the operation condition may relate to the channel quality of one value out of a set of values. The plurality of CQI values may comprise multiple sets of CQI values. The third indication from the radio node 101 may indicate to use the one set of the multiple sets of CQI values. The one set of the multiple sets of CQI values may be configured to have been selected based on the channel quality value. The multiple sets of CQI values may overlap.

In some embodiments, the operation condition may be one of: channel quality under the threshold and channel quality over the threshold. The wireless device 120, the receiving module 1001 and/or the processor 1004 may be configured to receive indication from the radio node to use the first set of the plurality of CQI values when the operation condition is of channel quality under the threshold, and to use the second set of the plurality of CQI values when the operation condition is of channel quality over the threshold, and the plurality of CQI values may comprise multiple sets of CQI values.

The wireless device 120 may comprise a transmitting module 1002. The wireless device 120, the transmitting module 1002 and/or the processor 1004 may be configured to transmit an indication, the second indication, to the radio node 101 for the operation condition of the wireless device 120 relating to coverage. The operation condition may be relating to one of: normal coverage and enhanced coverage.

In some embodiments, the wireless device 120, the transmitting module 1002 and/or the processor 1004 may be further configured to transmit the CQI value to the radio node 101 according to the value of the configured plurality of CQI values. The CQI value may be configured to be transmitted based on the CSI reference resource in time domain configured to be defined by the one or more DL or special subframes.

In some embodiments, the CSI reference may be further configured to be defined by the set of $n_{rep}$ DL or special subframes where the last subframe is subframe $n-n_{CQI\_ref}$, wherein subframe n is the subframe index of CSI reporting, and $n_{CQI\_ref}$ depends on the CSI reporting mode, and wherein $n_{rep}$ is the number of repetitions corresponding to the CQI value.

The wireless device 120 may further comprise other modules 1003 for other functions.

The embodiments herein may be implemented through one or more processors, such as the processor 1004 in the wireless device 120 depicted in FIG. 10, together with computer program code for performing the functions and actions of the embodiments herein. The program code mentioned above may also be provided as a computer program product, for instance in the form of a data carrier carrying computer program code for performing the embodiments herein when being loaded into the in the wireless device 120. One such carrier may be in the form of a CD ROM disc. It is however feasible with other data carriers such as a memory stick. The computer program code may furthermore be provided as pure program code on a server and downloaded to the wireless device 120.

The wireless device 120 may further comprise a memory 1005, comprising one or more memory units. The memory 1005 is arranged to be used to store obtained information, store data, configurations, schedulings, and applications etc. to perform the methods herein when being executed in the wireless device 120.

In some embodiments, the wireless device 120 may receive information from the radio node 101 through a receiving port 1006. In some embodiments, the receiving port 1006 may be, for example, connected to the two or more antennas in wireless device 120. In other embodiments, the wireless device 120 may receive information from another structure in the wireless communication network 100 through the receiving port 1006. Since the receiving port 1006 may be in communication with the processor 1004, the receiving port 1006 may then send the received information to the processor 1004. The receiving port 1006 may also be configured to receive other information.

The processor 1004 in the wireless device 120 may be further configured to transmit or send information to e.g., the wireless device 120, through a sending port 1007, which may be in communication with the processor 1004, and the memory 1005.

Those skilled in the art will also appreciate that modules described above may refer to a combination of analog and digital modules, and/or one or more processors configured with software and/or firmware, e.g., stored in memory, that, when executed by the one or more processors such as the processor 1004, perform as described above. One or more of these processors, as well as the other digital hardware, may be included in a single Application-Specific Integrated Circuit (ASIC), or several processors and various digital hardware may be distributed among several separate components, whether individually packaged or assembled into a System-on-a-Chip (SoC).

Also, in some embodiments, the different modules described above may be implemented as one or more applications running on one or more processors such as the processor 1004.

Thus, the methods according to the embodiments described herein for the wireless device 120 may be respectively implemented by means of a computer program product, comprising instructions, i.e., software code portions, which, when executed on at least one processor, cause the at least one processor to carry out the actions described herein, as performed by the wireless device 120. The computer program product may be stored on a computer-readable storage medium. The computer-readable storage medium, having stored thereon the computer program, may comprise instructions which, when executed on at least one processor, cause the at least one processor to carry out the actions described herein, as performed by wireless device 120. In some embodiments, the computer-readable storage medium may be a non-transitory computer-readable storage medium, such as a CD ROM disc, or a memory stick. In other embodiments, the computer program product may be stored on a carrier containing the computer program just described, wherein the carrier is one of an electronic signal, optical signal, radio signal, or the computer-readable storage medium, as described above.

When using the word "comprise" or "comprising" it shall be interpreted as non-limiting, i.e. meaning "consist at least of".

The embodiments herein are not limited to the above described preferred embodiments. Various alternatives, modifications and equivalents may be used. Therefore, the above embodiments should not be taken as limiting the scope of the invention. It is to be understood that the embodiments are not to be limited to the specific examples disclosed, and that modifications and other variants are intended to be included within the scope of this disclosure. Although specific terms may be employed herein, they are used in a generic and descriptive sense only and not for purposes of limitation.

Figure 11:
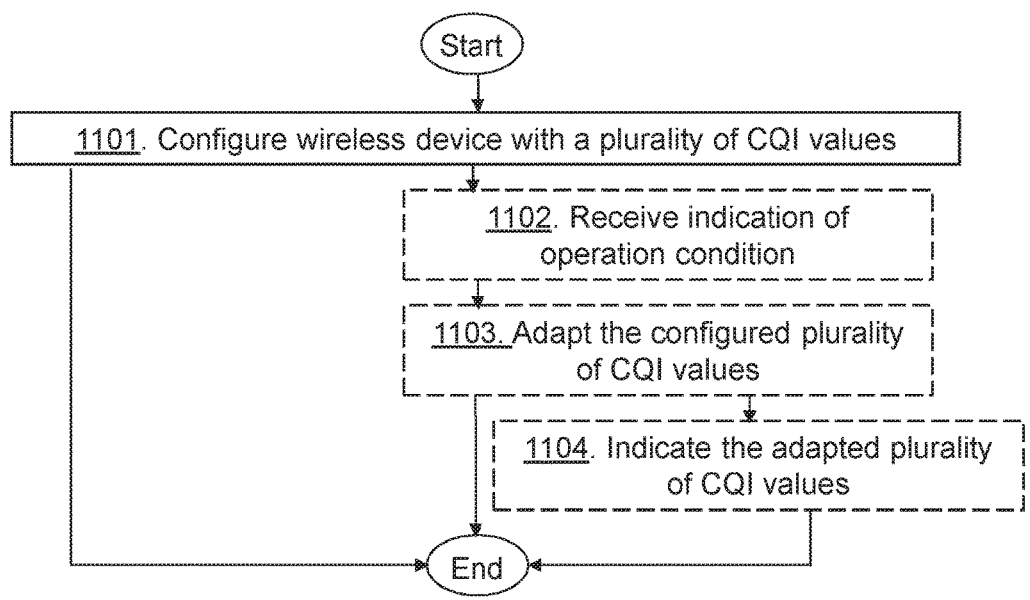
FIG. 11 is a flowchart depicting embodiments of a method in a radio node, according to examples related to embodiments herein.

Examples Related to Embodiments Herein:

FIG. 11 is a schematic flowchart disclosing a method that may be performed in the radio node 101 for configuring the wireless device 120. The radio node 101 and the wireless device 120 are operating in a wireless communication network 100.

Action 1101. The radio node 101 configures the wireless device 120 with a plurality of CQI values, each CQI value of the plurality of CQI values is associated with a first indication that a data transmission is repeatedly transmitted towards the wireless device 120. Repeatedly transmitted may mean e.g., repetition across a plurality of subframes in time. The configured plurality of CQI values may comprise 16 values, all of which are configured in association with QPSK modulation. The configured plurality of CQI values may comprise 32 values, all of which are configured in association with QPSK modulation. The configuration may be performed according to a signal sent from the radio node 101 or a signal sent from the wireless device 120.

The CQI values may be configured in association with an indication, being an example of the first indication, of spectral efficiency, the indication of spectral efficiency being calculated based on repetition of information across a plurality of radio resources in time, e.g., repetition across a plurality of subframes in time. The first indication may indicate a number of repetitions of data transmission comprises a set of numbers of repetitions of data transmission.

The CQI values may be known to the radio node 101 as well, so that the radio node 101 may know how to interpret a reported CQI value.

Action 1102. The radio node 101 may receive an indication from the wireless device 120 for an operation condition of the wireless device 120 relating to coverage.

Action 1103. The radio node 101 may then adapt the configured plurality of CQI values or select a part of the plurality of CQI values according to the received indication from the wireless device 120. The operation condition may relate to one of: normal coverage and enhanced coverage. The operation condition may relate to one of: channel quality under a threshold and channel quality over a threshold. The radio node 101 may then adapt the configured plurality of QCI values and configure the wireless device 120 to use a first set of the plurality of CQI values when the operation condition is of channel quality under the threshold, and to use a second set of the plurality of CQI values when the operation condition is of channel quality over the threshold. The channel quality may be one value out of a set of values. The plurality of CQI values may comprise multiple sets of CQI values, and the radio node 101 may then adapt the configured plurality of QCI values and configure the wireless device 120 to use one set of the multiple sets of CQI values, wherein the one set of the multiple sets of CQI values is selected based on the channel quality value. The multiple sets of CQI values may overlap. The configuring of the wireless device 120 may be understood to be performed through the following action 1104.

Action 1104. The radio node 101 may indicate the adapted plurality of CQI values to the wireless device 120.

The radio node 101 may additionally receive a CQI value from the wireless device 120 being a value of the configured plurality of CQI values.

According to another aspect the object is achieved by providing a method performed by a wireless device for configuring the wireless device from a radio node.

Figure 12:
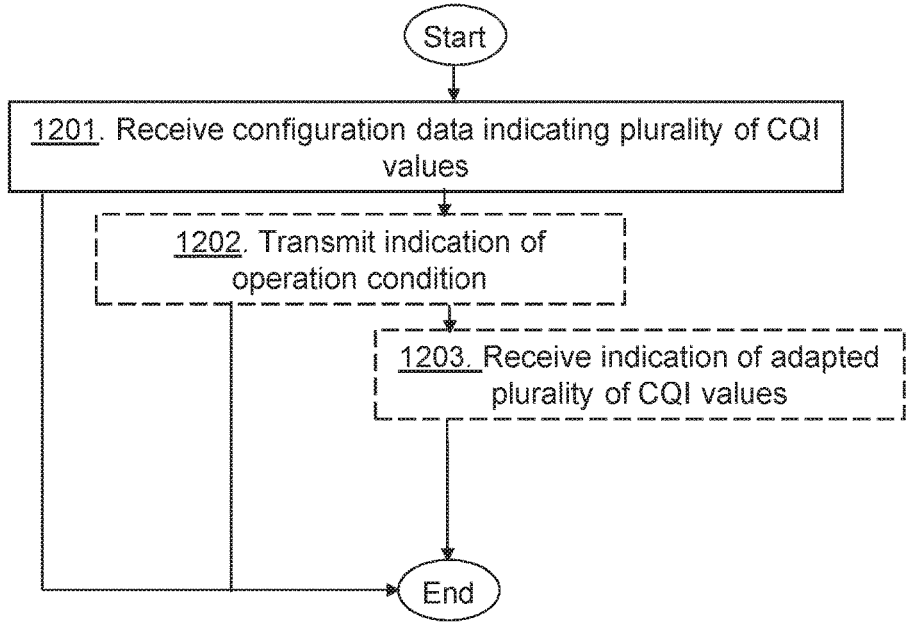
FIG. 12 is a flowchart depicting embodiments of a method in a wireless device, according to examples related to embodiments herein.

FIG. 12 is a schematic flow chart depicting a method which may be performed by the wireless device 120 for configuring the wireless device 120 from the radio node 101. The radio node 101 and the wireless device 120 are operating in a wireless communication network.

Action 1201. The wireless device 120 receives configuration data from the radio node 101, which configuration data indicates configuration for a plurality of CQI values at the wireless device 120. Each CQI value of the plurality of CQI values is associated with a first indication that a data transmission is repeatedly transmitted towards the wireless device 120. Each CQI value of the plurality of CQI values may be configured in association with an indication of spectral efficiency, the indication of spectral efficiency may be calculated based on repetition of information across a plurality of radio resources in time.

Action 1202. The wireless device 120 may transmit an indication to the radio node 101 for an operation condition of the wireless device 120 relating to coverage. The operation condition may be one of: normal coverage and enhanced coverage. For example, the configuration parameter $I_{coverage}$ may take several values. Instead of two values ($I_{coverage}$='normal' and $I_{coverage}$='enhanced'), $I_{coverage}$ may be configured to indicate one out of several CQI tables corresponding to different coverage enhancement levels, e.g. $I_{coverage}$='normal', $I_{coverage}$='somewhat enhanced', $I_{coverage}$='very enhanced', and $I_{coverage}$='extremely enhanced' (or, alternatively, $I_{coverage}=\{0, 1, 2, 3\}$).

Action 1203. The wireless device 120 may then receive an indication of adapted plurality of CQI values from the radio node 101. The operation condition may be one of: channel quality under a threshold and channel quality over a threshold. The wireless device 120 may then receive indication from the radio node 101 to use a first set of the plurality of CQI values when the operation condition is of channel quality under the threshold, and to use a second set of the plurality of CQI values when the operation condition is of channel quality over the threshold. The operation condition may relate to a channel quality of one value out of a set of values, and wherein the plurality of CQI values comprises multiple sets of CQI values. The wireless device 120 may then receive indication from the radio node 101 to use one set of the multiple sets of CQI values, wherein the one set of the multiple sets of CQI values has been selected based on the channel quality value. The multiple sets of CQI values may overlap.

The first indication may indicate number of repetitions of data transmission and may comprise a set of numbers of repetitions of data transmission.

The configured plurality of CQI values may comprise 16 values, all of which are configured in association with QPSK modulation. The configured plurality of CQI values may comprise 32 values, all of which are configured in association with QPSK modulation.

The wireless device 120 may transmit a CQI value to the radio node 101 according to a value of the configured plurality of CQI values.

Furthermore, a wireless device and a radio node may be provided to perform the methods disclosed herein.

The invention claimed is:

1. A method performed by a radio node for configuring a plurality of Channel Quality Information (CQI) values, the radio node operating in a wireless communication network, the method comprising:
 configuring a wireless device operating in the wireless communication network with the plurality of CQI values, each of the plurality of CQI values being configured in association with a first indication for a number of repetitions of data transmission;
 receiving a second indication from the wireless device for an operation condition of the wireless device relating to coverage;
 adapting the configured plurality of CQI values according to the received second indication from the wireless device; and
 indicating the adapted plurality of CQI values to the wireless device.

2. The method of claim 1, wherein the operation condition is related to one of: normal coverage and enhanced coverage.

3. The method of claim 1, wherein the operation condition is related to a channel quality value, and wherein the plurality of CQI values comprises multiple sets of CQI values, and wherein the indicating comprises configuring the wireless device to use one set of the multiple sets of CQI values, wherein the one set of the multiple sets of CQI values has been selected based on the channel quality value.

4. The method of claim 1, wherein the first indication for the number of repetitions of data transmission provides a set of numbers of repetitions of data transmission.

5. The method of claim 1, wherein a CQI value received from the wireless device according to a value of the configured plurality of CQI values is based on a Channel State Information (CSI) reference resource in time domain which is defined by one or more downlink or special subframes.

6. The method of claim 5, wherein the CSI reference resource is further defined by a set of $n_{rep}$ downlink or special subframes where the last subframe is subframe $n - n_{CQI\_ref}$, wherein subframe n is a subframe index of CSI reporting, and $n_{CQI\_ref}$ depends on a CSI reporting mode, and wherein $n_{rep}$ is the number of repetitions corresponding to a CQI value.

7. A non-transitory computer-readable storage medium, having stored thereon a computer program comprising instructions that, when executed on at least one processor of a radio node operating in a wireless communication network, cause the at least one processor to:
 configure a wireless device operating in the wireless communication network with a plurality of channel quality indicator (CQI) values, each of the plurality of CQI values being configured in association with a first indication for a number of repetitions of data transmission;

receive a second indication from the wireless device for an operation condition of the wireless device relating to coverage;

adapt the configured plurality of CQI values according to the received second indication from the wireless device; and indicate the adapted plurality of CQI values to the wireless device.

8. A method performed by a wireless device for receiving configuration data from a radio node, the radio node and the wireless device operating in a wireless communication network, the method comprising:

receiving the configuration data from the radio node, which configuration data indicates configuration for a plurality of Channel Quality Information (CQI) values, each CQI value of the plurality of CQI values being associated with a first indication for a number of repetitions of data transmission;

transmitting a second indication to the radio node for an operation condition of the wireless device relating to coverage; and receiving a third indication of an adapted plurality of CQI values from the radio node, the adapted plurality of CQI values comprising the plurality of CQI values adapted according to the operation condition of the wireless device.

9. The method of claim 8, wherein the operation condition is relating to one of: normal coverage and enhanced coverage.

10. The method of claim 8, wherein the operation condition is related to a channel quality value, and wherein the plurality of CQI values comprises multiple sets of CQI values, and wherein the third indication from the radio node indicates to use one set of the multiple sets of CQI values, wherein the one set of the multiple sets of CQI values has been selected based on the channel quality value.

11. The method of claim 8, wherein the first indication for the number of repetitions of data transmission provides a set of numbers of repetitions of data transmission.

12. The method of claim 8, further comprising transmitting a CQI value to the radio node according to a value of the configured plurality of CQI values, the transmitted CQI value being based on a Channel State Information (CSI) reference resource in time domain defined by one or more downlink or special subframes.

13. The method of claim 12, wherein the CSI reference is further defined by a set of $n_{rep}$ downlink or special subframes where the last subframe is subframe $n-n_{CQI\_ref}$, wherein subframe n is a subframe index of CSI reporting, and $n_{CQI\_ref}$ depends on a CSI reporting mode, and wherein $n_{rep}$ is the number of repetitions corresponding to a CQI value.

14. A non-transitory computer-readable storage medium, having stored thereon a computer program comprising instructions that, when executed on at least one processor of a wireless device operating, with a radio node, in a wireless communication network, cause the at least one processor to:

receive configuration data from the radio node, which configuration data indicates configuration for a plurality of Channel Quality Information (CQI) values, each CQI value of the plurality of CQI values being associated with a first indication for a number of repetitions of data transmission;

transmit a second indication to the radio node for an operation condition of the wireless device relating to coverage; and receive a third indication of an adapted plurality of CQI values from the radio node, the adapted plurality of CQI values comprising the plurality of CQI values adapted according to the operation condition of the wireless device.

15. A radio node configured to configure a plurality of Channel Quality Information (CQI) values, the radio node being configured to operate in a wireless communication network, and the radio node comprising:

at least one processor; and at least one memory storing computer-executable instructions that, when executed by the at least one processor, configure the radio node to:

configure a wireless device operating in the wireless communication network with the plurality of CQI values, each of the plurality of CQI values being configured in association with a first indication for a number of repetitions of data transmission;

receive a second indication from the wireless device for an operation condition of the wireless device relating to coverage;

adapt the configured plurality of CQI values according to the received second indication from the wireless device; and indicate the adapted plurality of CQI values to the wireless device.

16. The radio node of claim 15, wherein the operation condition is related to one of: normal coverage and enhanced coverage.

17. The radio node of claim 15, wherein the operation condition is related to a channel quality value, and wherein the plurality of CQI values comprises multiple sets of CQI values, and wherein to indicate comprises to configure the wireless device to use one set of the multiple sets of CQI values, wherein the one set of the multiple sets of CQI values is configured to have been selected based on the channel quality value.

18. The radio node of claim 15, wherein the first indication for the number of repetitions of data transmission provides a set of numbers of repetitions of data transmission.

19. The radio node of claim 15, wherein a CQI received from the wireless device according to a value of the configured plurality of CQI values is based on a Channel State Information (CSI) reference resource in time domain which is configured to be defined by one or more downlink or special subframes.

20. The radio node of claim 19, wherein the CSI reference resource is further configured to be defined by a set of $n_{rep}$ downlink or special subframes where the last subframe is subframe $n-n_{CQI\_ref}$, wherein subframe n is a subframe index of CSI reporting, and $n_{CQI\_ref}$ depends on a CSI reporting mode, and wherein $n_{rep}$ is the number of repetitions corresponding to a CQI value.

21. A wireless device configured to receive configuration data from a radio node, the radio node and the wireless device being configured to operate in a wireless communication network, the wireless device comprising:

at least one processor; and at least one memory storing computer-executable instructions that, when executed by the at least one processor, configure the wireless device to:

receive the configuration data from the radio node, which configuration data is configured to indicate configuration for a plurality of Channel Quality Information (CQI) values, each CQI value of the plurality of CQI values being associated with a first indication for a number of repetitions of data transmission;

transmit a second indication to the radio node for an operation condition of the wireless device relating to coverage; and receive a third indication of an adapted plurality of CQI values from the radio node, the adapted plurality of CQI values comprising the plurality of CQI values adapted according to the operation condition of the wireless device.

22. The wireless device of claim 21, wherein the operation condition is relating to one of: normal coverage and enhanced coverage.

23. The wireless device of claim 21, wherein the operation condition is related to a channel quality value, and wherein the plurality of CQI values comprises multiple sets of CQI values, and wherein the third indication from the radio node indicates to use one set of the multiple sets of CQI values, wherein the one set of the multiple sets of CQI values is configured to have been selected based on the channel quality value.

24. The wireless device of claim 21, wherein the first indication for the number of repetitions of data transmission is configured to provide a set of numbers of repetitions of data transmission.

25. The wireless device of claim 21, wherein execution of the instructions further configures the wireless device to transmit a CQI value to the radio node according to a value of the configured plurality of CQI values, the CQI value configured to be transmitted being based on a Channel State Information (CSI) reference resource in time domain configured to be defined by one or more downlink or special subframes.

26. The wireless device of claim 25, wherein the CSI reference is further configured to be defined by a set of $n_{rep}$ downlink or special subframes where the last subframe is subframe n-$n_{CQI\_ref}$, wherein subframe n is a subframe index of CSI reporting, and $n_{CQI\_ref}$ depends on a CSI reporting mode, and wherein $n_{rep}$ is the number of repetitions corresponding to a CQI value.

* * * * *